US012119762B2

(12) United States Patent
Sakaguchi et al.

(10) Patent No.: US 12,119,762 B2
(45) Date of Patent: Oct. 15, 2024

(54) MOTOR CONTROL DEVICE

(71) Applicant: DENSO CORPORATION, Kariya (JP)

(72) Inventors: Kouji Sakaguchi, Kariya (JP); Seiji Nakayama, Kariya (JP); Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 184 days.

(21) Appl. No.: 17/685,524

(22) Filed: Mar. 3, 2022

(65) Prior Publication Data
US 2022/0190750 A1 Jun. 16, 2022

Related U.S. Application Data

(63) Continuation of application No. PCT/JP2020/031451, filed on Aug. 20, 2020.

(30) Foreign Application Priority Data

Sep. 10, 2019 (JP) ................. 2019-164478

(51) Int. Cl.
*H02P 23/28* (2016.01)
*H02P 1/02* (2006.01)
*F16H 61/32* (2006.01)
*F16H 63/34* (2006.01)

(52) U.S. Cl.
CPC .............. *H02P 1/029* (2013.01); *F16H 61/32* (2013.01); *F16H 2061/326* (2013.01); *F16H 63/3466* (2013.01)

(58) Field of Classification Search
CPC .................... H02P 6/14; H02P 21/18
See application file for complete search history.

(56) References Cited

U.S. PATENT DOCUMENTS

2014/0139172 A1  5/2014  Yamada
2015/0222211 A1*  8/2015  Maruo ................ H02P 23/0027
                                                318/612
2019/0103825 A1  4/2019  Nagata et al.
2019/0190410 A1*  6/2019  Aoki ........................ H02P 6/15
2020/0224762 A1  7/2020  Yamamoto et al.
2020/0263789 A1  8/2020  Sakaguchi et al.

* cited by examiner

*Primary Examiner* — Kawing Chan
*Assistant Examiner* — Charles S Laughlin
(74) *Attorney, Agent, or Firm* — Nixon & Vanderhye P.C.

(57) ABSTRACT

A motor control device controls the drive of a motor including a motor winding. The motor control device is provided with an energization control unit and a standstill determination unit. The energization control unit controls the energization of the motor winding in accordance with a detection value of a rotational position sensor that detects a rotational position of the motor. The standstill determination unit determines a standstill of the motor. When a standstill of the motor is detected, the energization control unit controls energization in a change pattern that is an energization pattern different from a preset regular pattern in accordance with the detection value of the rotational position sensor.

17 Claims, 30 Drawing Sheets

| ENERGIZATION PATTERN | 0 | 1 | 2 | 3 | 4 | 5 | 6 | 7 | 8 | 9 | 10 | 11 |
|---|---|---|---|---|---|---|---|---|---|---|---|---|
| U-PHASE | ○ | ○ | ○ | ○ | ○ | ○ | ○ |   |   |   |   | ○ |
| V-PHASE |   |   | ○ | ○ | ○ | ○ | ○ | ○ | ○ | ○ |   |   |
| W-PHASE | ○ | ○ | ○ |   |   |   | ○ | ○ | ○ | ○ | ○ | ○ |

| ENERGIZATION PATTERN | 0 | 1 | 2 | 3 | 4 | 5 | 6 | 7 | 8 | 9 | 10 | 11 |
|---|---|---|---|---|---|---|---|---|---|---|---|---|
| U-PHASE | O | O | O | O | O | O | O | O | | | | |
| V-PHASE | | | | O | O | O | O | O | O | O | O | O |
| W-PHASE | O | O | O | O | | | | | O | O | O | O |

| ENERGIZATION PATTERN | 0 | 1 | 2 | 3 | 4 | 5 | 6 | 7 | 8 | 9 | 10 | 11 |
|---|---|---|---|---|---|---|---|---|---|---|---|---|
| U-PHASE | O | O | O | O | O | O |  |  |  |  | O | O |
| V-PHASE |  |  | O | O | O | O | O | O | O | O |  |  |
| W-PHASE | O | O |  |  |  |  | O | O | O | O | O | O |

| ENERGIZATION PATTERN | 0 | 1 | 2 | 3 | 4 | 5 | 6 | 7 | 8 | 9 | 10 | 11 |
|---|---|---|---|---|---|---|---|---|---|---|---|---|
| U-PHASE | | ○ | ○ | ○ | ○ | | | | | | | |
| V-PHASE | | | | | | ○ | ○ | ○ | ○ | | | |
| W-PHASE | ○ | | | | | | | | | ○ | ○ | ○ |

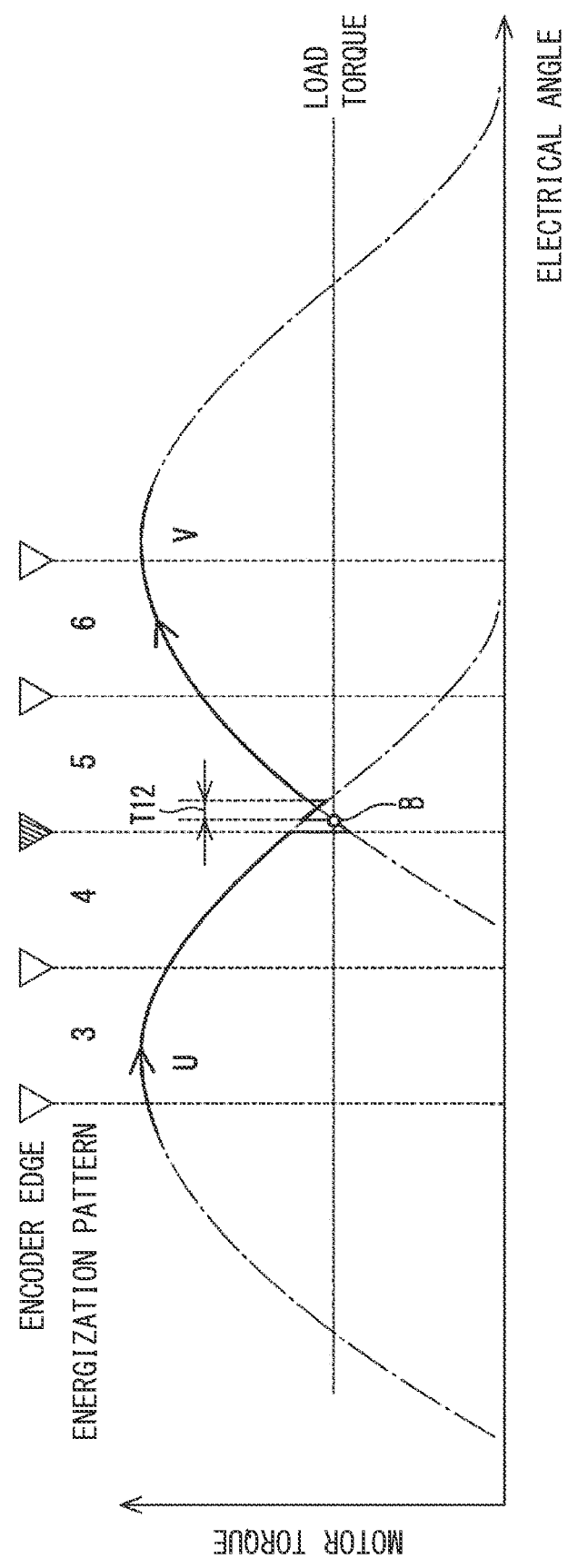

| ENERGIZATION PATTERN | 0 | 1 | 2 | 3 | 4 | 5 | 6 | 7 | 8 | 9 | 10 | 11 |
|---|---|---|---|---|---|---|---|---|---|---|---|---|
| U-PHASE | ○ | ○ | ○ | ○ | ○ | ○ | | | | | | |
| V-PHASE | | | | ○ | ○ | ○ | ○ | ○ | ○ | | | |
| W-PHASE | ○ | ○ | | | | | | | ○ | ○ | ○ | ○ |

MOTOR CONTROL DEVICE

CROSS REFERENCE TO RELATED APPLICATION

The present application is a continuation application of International Patent Application No. PCT/JP2020/031451 filed on Aug. 20, 2020, which designated the U.S. and claims the benefit of priority from Japanese Patent Application No. 2019-164478 filed on Sep. 10, 2019. The entire disclosures of all of the above applications are incorporated herein by reference.

TECHNICAL FIELD

The present disclosure relates to a motor control device.

BACKGROUND

Conventionally, a motor control device for controlling the drive of a motor is known.

SUMMARY

A motor control device according to an aspect of the present disclosure is configured to control drive of a motor including a motor winding.

BRIEF DESCRIPTION OF THE DRAWINGS

The above and other objects, features and advantages of the present disclosure will become more apparent from the following detailed description made with reference to the accompanying drawings. In the drawings:

FIG. 27 is an explanatory diagram for explaining control during a motor standstill according to a ninth embodiment.

DETAILED DESCRIPTION

Figure 1:
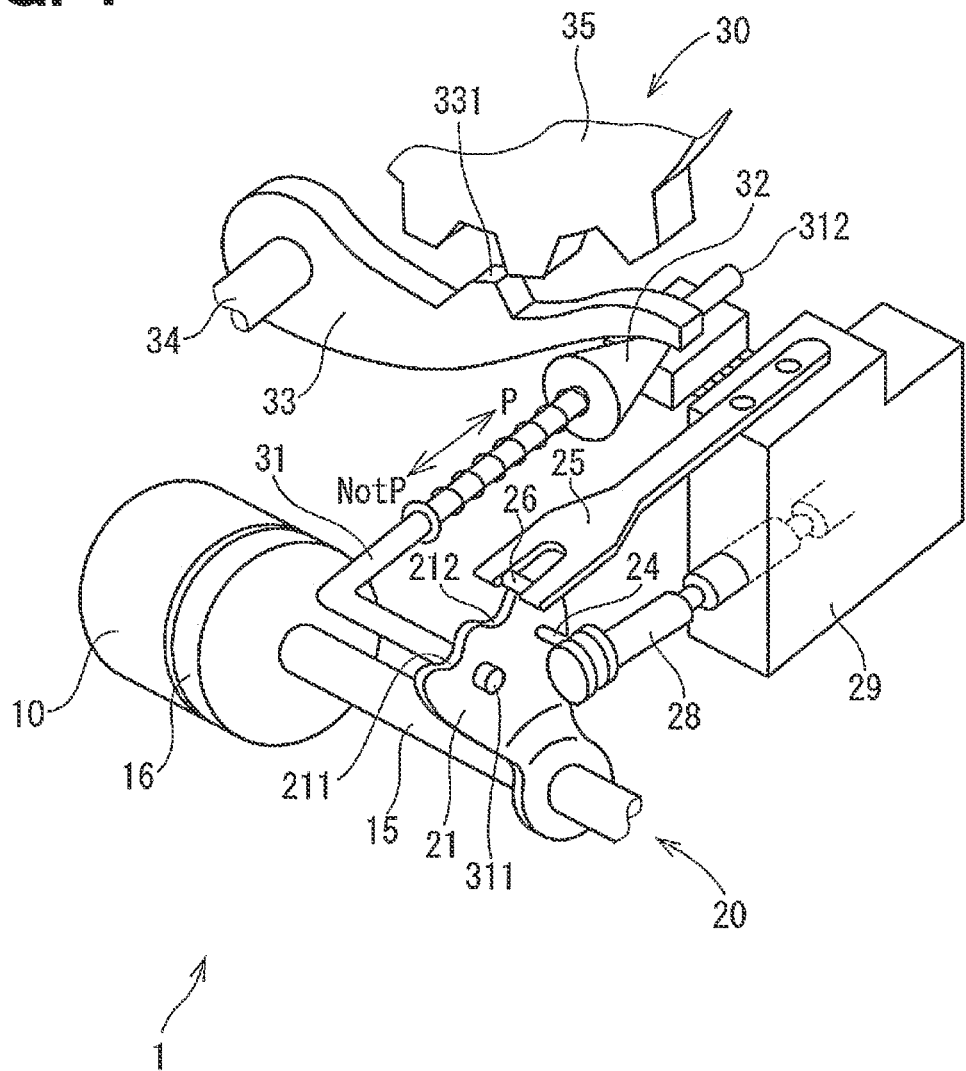
FIG. 1 is a perspective view showing a shift-by-wire system according to a first embodiment.

Hereinafter, examples of the present disclosure will be described.

According to an example of the present disclosure, a motor control device controls a drive of a motor, such that the number of energization phases to be simultaneously energized is made constant so as to reduce the torque fluctuation of the motor.

Herein, at the time of switching the energization phases, the torque may likely to drop near the angle at which the energization is switched. When the motor stops due to load torque or the like in such an angular position where the torque drops, there is a possibility that the motor cannot move again owing to insufficient torque.

A motor control device according to an aspect of the present disclosure is configured to control drive of a motor including a motor winding. The motor control device comprises an energization control unit and a standstill determination unit. The energization control unit is configured to control energization of the motor winding in accordance with a detection value of a rotational position sensor that is configured to detect a rotational position of the motor. The standstill determination unit is configured to determine a standstill of the motor. The energization control unit is configured to, when the standstill of the motor is detected, control energization in a change pattern, which is an energization pattern different from a preset regular pattern, in accordance with the detection value of the rotational position sensor. The configuration may enable, even when the motor becomes in a standstill state due to for example lack of a torque, to restart the motor appropriately.

A motor control device according to the present disclosure will be described below with reference to the drawings. Hereinafter, in a plurality of embodiments, substantially the same constituents are indicated by the same reference numerals, and the description thereof is omitted.

First Embodiment

Figure 2:
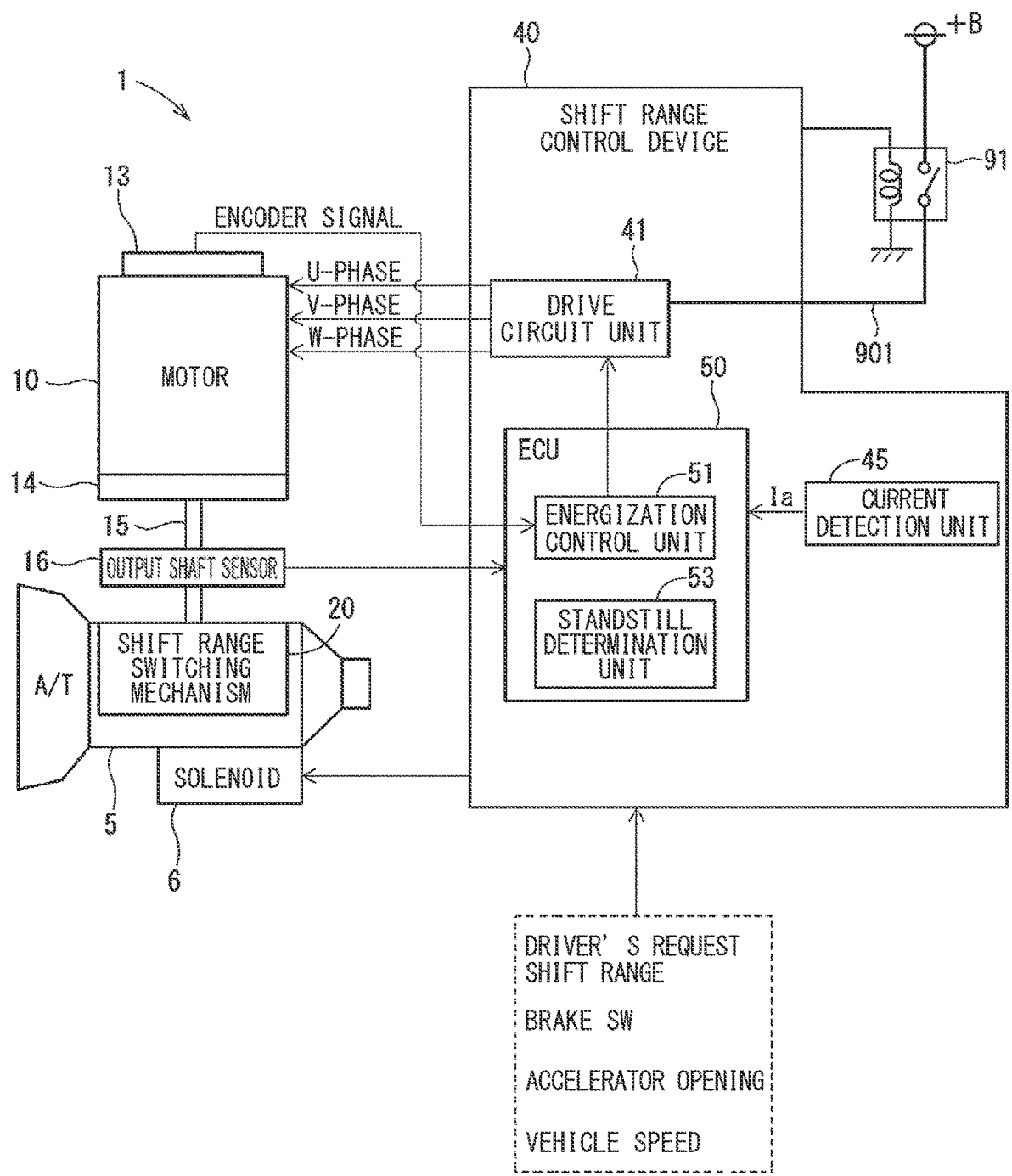
FIG. 2 is a schematic configuration diagram showing the shift-by-wire system according to the first embodiment.

FIGS. 1 to 10 show a first embodiment. As shown in FIGS. 1 and 2, a shift-by-wire system 1, which is a motor drive system, includes a motor 10, a shift range switching mechanism 20, a parking lock mechanism 30, a shift range control device 40 as a motor control device, and the like.

Figure 3:
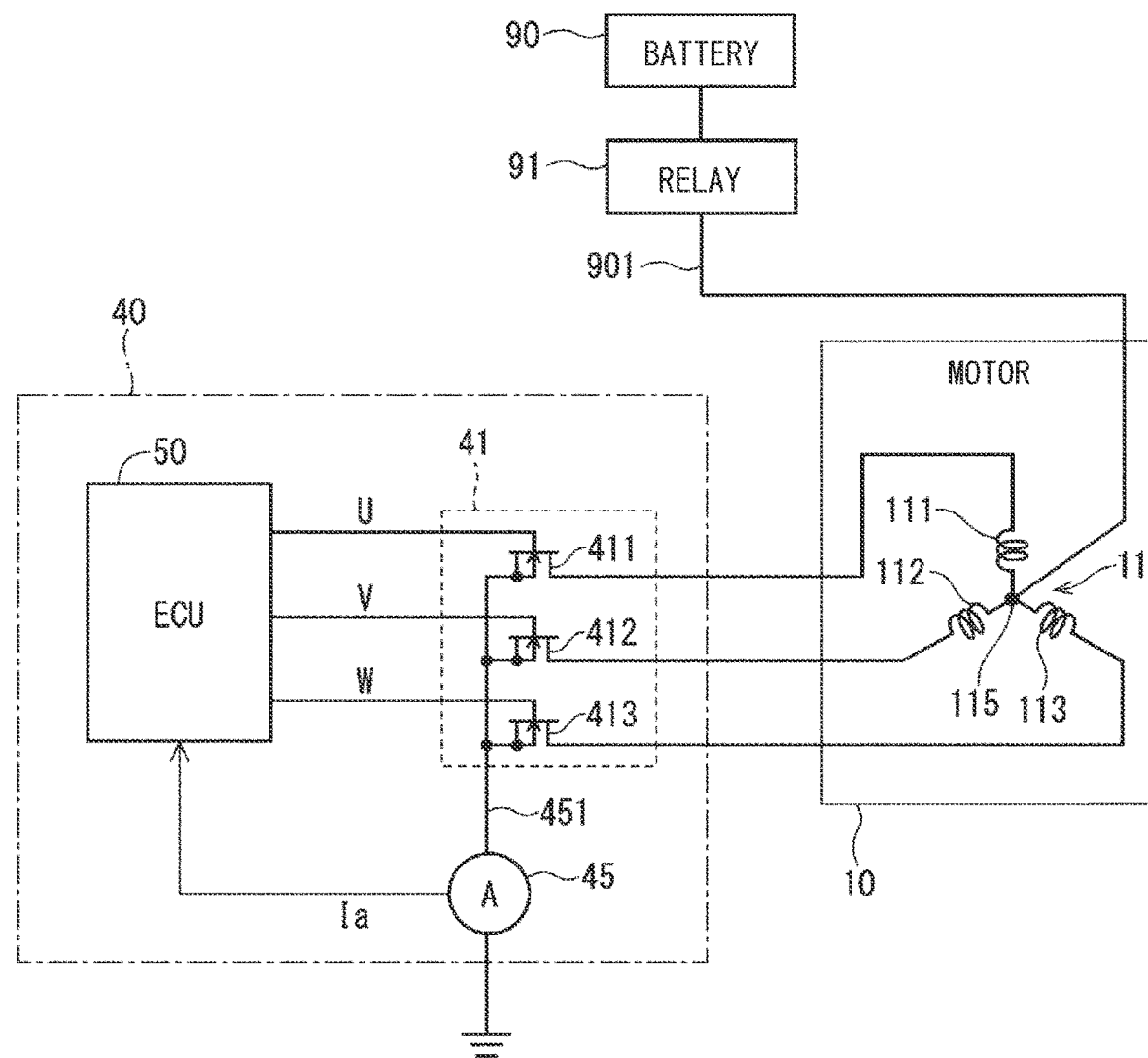
FIG. 3 is a circuit diagram showing a shift range control device according to the first embodiment.

The motor 10 rotates by being supplied with power from a battery 90 mounted in a vehicle (not shown) and functions as a drive source for the shift range switching mechanism 20. The motor 10 of the present embodiment is, for example, a switched reluctance motor. As shown in FIG. 3, the motor 10 includes a motor winding 11 wound around a salient pole of a stator (not shown). The motor winding 11 has a U-phase winding 111, a V-phase winding 112, and a W-phase winding 113. A rotor (not shown) is rotated by controlling the energization to the motor winding 11. For example, the number of salient poles of the stator is 12, and the number of salient poles of the rotor is eight.

As shown in FIG. 2, an encoder 13, which is a rotational position sensor, detects the rotational position of the rotor (not shown) of the motor 10. The encoder 13 is, for example, a magnetic rotary encoder and is made up of a magnet that rotates integrally with the rotor, a magnetic detection hall integrated circuit (IC), and the like. The encoder 13 outputs encoder signals that are A-phase and B-phase pulse signals at predetermined angles in synchronization with the rotation of the rotor.

A speed reducer 14 is provided between a motor shaft of the motor 10 and an output shaft 15, decelerates the rotation of the motor 10, and outputs the rotation to the output shaft 15. Thereby, the rotation of the motor 10 is transmitted to the shift range switching mechanism 20. The output shaft 15 is provided with an output shaft sensor 16 that detects the angle of the output shaft 15. The output shaft sensor 16 is, for example, a potentiometer.

As shown in FIG. 1, the shift range switching mechanism 20 includes a detent plate 21, a detent spring 25, and the like and transmits a rotational driving force, output from the speed reducer 14, to a manual valve 28 and the parking lock mechanism 30.

The detent plate 21 is fixed to the output shaft 15 and driven by the motor 10. The detent plate 21 is provided with a pin 24 that protrudes in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into linear motion and transmits the linear motion to the manual valve 28. The manual valve 28 is provided on a valve body 29. A hydraulic pressure supply path to a hydraulic clutch (not shown) is switched by the reciprocation of the manual valve 28 in the axial direction, and the shift range is changed by the switching of the engagement state of the hydraulic clutch.

Two recesses 211, 212 are provided in the detent plate 21 on the detent spring 25 side. In the present embodiment, the recess 211 corresponds to a P range, and the recess 212 corresponds to a Not-P range that is a range except for the P range.

The detent spring 25 is an elastically deformable plate-shaped member, and a detent roller 26 is provided at the tip. The detent spring 25 biases the detent roller 26 toward the revolving center side of the detent plate 21. When a rotational force equal to or greater than a predetermined force is applied to the detent plate 21, the detent spring 25 is elastically deformed, and the detent roller 26 moves between the recesses 211, 212. By the detent roller 26 being fitted into either the recesses 211, 212, a swing of the detent plate 21 is restricted, an axial position of the manual valve 28 and the state of the parking lock mechanism 30 are determined, and the shift range of an automatic transmission 5 is fixed.

The parking lock mechanism 30 includes a parking rod 31, a cone 32, a parking lock pole 33, a shaft portion 34, and a parking gear 35. The parking rod 31 is formed in a substantially L shape, and one end 311 side is fixed to the detent plate 21. The cone 32 is provided on the other end 312 side of the parking rod 31. The cone 32 is formed so as to decrease in diameter toward the other end 312 side. When the detent plate 21 rotates in a direction in which the detent roller 26 fits into the recess 211 corresponding to the P range, the cone 32 moves in the direction of an arrow P.

The parking lock pole 33 abuts on the conical surface of the cone 32 and is provided to be swingable about the shaft portion 34. On the side of the parking gear 35 of the parking lock pole 33, a protrusion 331 capable of meshing with the parking gear 35 is provided. When the cone 32 moves in the direction of the arrow P by the rotation of the detent plate 21, the parking lock pole 33 is pushed up, and the protrusion 331 and the parking gear 35 mesh with each other. On the other hand, when the cone 32 moves in the direction of an arrow Not-P, the engagement between the protrusion 331 and the parking gear 35 is released.

The parking gear 35 is provided on an axle (not shown) and is provided so as to be able to mesh with the protrusion 331 of the parking lock pole 33. When the parking gear 35 and the protrusion 331 mesh with each other, the rotation of the axle is restricted. When the shift range is the not-P range that is a range except for P, the parking gear 35 is not locked by the parking lock pole 33, and the rotation of the axle is not hindered by the parking lock mechanism 30. When the shift range is the P range, the parking gear 35 is locked by the parking lock pole 33, and the rotation of the axle is restricted.

As shown in FIGS. 2 and 3, the shift range control device 40 includes a drive circuit unit 41, a current detection unit 45, an electronic control unit (ECU) 50, and the like. As shown in FIG. 3, the drive circuit unit 41 includes three switching elements 411, 412, 413. In the present embodiment, the drive circuit unit 41 is provided between the windings 111 to 113 of the respective phases and the ground. The switching elements 411 to 413 are provided corresponding to the windings 111 to 113 of the respective phase and switch the energization of the corresponding phases. Each of the switching elements 411 to 413 of the present embodiment is a metal-oxide-semiconductor field-effect transistor (MOSFET) but may be an insulated gate bipolar transistor (IGBT) or the like.

The windings 111 to 113 of the motor winding 11 are connected by a wire connection 115. Power is supplied from the battery 90 to the wire connection 115 via a power supply line 901. The power supply line 901 is provided with a relay 91, and power is supplied to the wire connection 115 when the relay 91 is turned on. The current detection unit 45 is provided in the collective wiring 451 connecting the source of each of the switching elements 411 to 413 and the ground and detects a collective current Ia that is a sum of currents flowing through the windings 111 to 113.

The ECU 50 includes a central processing unit (CPU), a read-only memory (ROM), a random-access memory (RAM), an input/output (I/O) (not shown), a bus line that connects these constituents, and the like. Each processing in the ECU 50 may be software processing performed by the CPU executing a program stored in advance in a tangible memory device (i.e., a readable non-transitory tangible recording medium) such as a ROM, or may be hardware processing performed by a dedicated electronic circuit.

As shown in FIG. 2, the ECU 50 controls the switching of the shift range by controlling the drive of the motor 10 based on a shift signal corresponding to a driver's request shift range, a signal from a brake switch, a vehicle speed, and the like. Further, the ECU 50 controls the drive of a transmission hydraulic control solenoid 6 based on the vehicle speed, an accelerator opening, the driver's request shift range, and the like. A gear stage is controlled by controlling the transmission hydraulic control solenoid 6. The number of transmission hydraulic control solenoids 6 is provided in accordance with the number of gear stages. In the present embodiment, one ECU 50 controls the drive of the motor 10 and the drive of the solenoid 6, but a motor ECU for motor control, which controls the motor 10, and an automatic transmission (AT)-ECU for solenoid control may be separated. Hereinafter, the drive control for the motor 10 will be mainly described.

The ECU 50 includes an energization control unit 51 and a standstill determination unit 53. The energization control unit 51 commands the energization phases based on an encoder count value Cen corresponding to the encoder signal from the encoder 13 and controls the energization of the motor winding 11. The encoder count value Cen is counted up or counted down for each edge detection of the encoder signal. In the present embodiment, the encoder count value Cen is counted up at the time of forward rotation and is counted down at the time of reverse rotation. Further, current limitation is performed so that the collective current Ia does not exceed a current limit value. The standstill determination unit 53 determines the standstill of the motor 10.

Figures 4A, 4B:
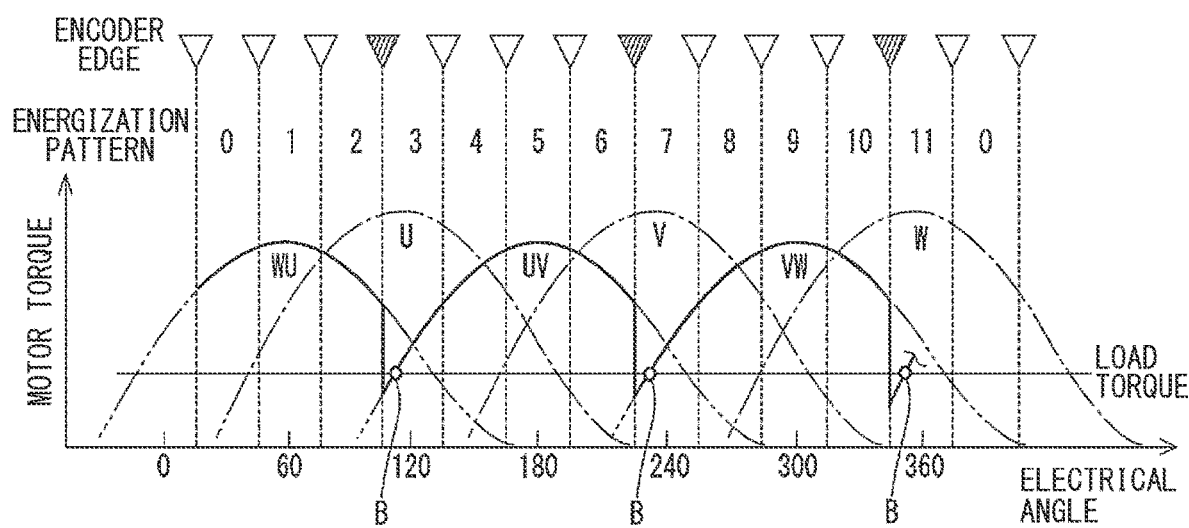
FIG. 4A is a diagram showing energization patterns and energization phases according to the first embodiment.
FIG. 4B is a diagram showing a relationship between an electrical angle and motor torque according to the first embodiment.

As shown in FIG. 4A, a relationship between an energization pattern number and energization phases is stored in a storage unit (not shown). The stored correspondence is defined as a regular pattern. In a normal state, every time the pulse edge of the encoder signal is detected, the energization pattern is shifted by +1 in the forward rotation and −1 in the reverse rotation. The motor 10 is rotated by switching the energization phases in accordance with the energization pattern. In FIG. 4A, the energization patterns P0 to P11 are set to one cycle corresponding to one electrical angle cycle, and phases energized in each energization pattern are indicated by circles. This also applies to FIGS. 20A, 22A, 25A, and 28A to be described later. In the drawing, in order to avoid complication, symbol "P" indicating the pattern number is omitted, and only the number is described.

In the present embodiment, the motor 10 is rotated by repeating two-phase energization that energizes two phases of the windings 111 to 113 without using one-phase energization that energizes one phase of the windings 111 to 113. In FIG. 4B, the horizontal axis represents the electrical angle, the vertical axis represents the motor torque, and the motor torque corresponding to the energization phases for one cycle of the electrical angle is shown. The motor torque is described on the assumption that each phase current is constant. The generated torque at the time of one-phase energization is indicated by an alternate long and short dash line, the generated torque at the time of two-phase energization is indicated by an alternate long and two short dashes line, the encoder edge generation portion is indicated by a triangle, and the energization pattern is also indicated. In addition, hatching is applied to a portion where the energization phases are switched in the regular pattern among the symbols indicating the encoder edge generation portions. This also applies to the drawings according to embodiments to be described later. Hereinafter, a case where the motor 10 rotates forward will be mainly described.

In the present embodiment, as indicated by a solid line, the WU-phase energization is performed by turning on the switching elements 411, 413 in the energization patterns P0 to P2, P11, and the switching elements 411, 412 are turned on to make switching to the UV-phase energization when the encoder edge is detected in the energization pattern P2. In the energization patterns P3 to P6, the UV-phase energization is continued. When the encoder edge is detected in the energization pattern P6, the switching elements 412, 413 are turned on to make switching to the VW-phase energization. In the energization patterns P7 to P10, the VW-phase energization is continued. When the encoder edge is detected in the energization pattern P10, switching is made to the WU-phase energization.

In each of the energization patterns P3, P7, P11 immediately after the switching of the energization pattern, there is a region where the motor torque drops. Herein, a predetermined range including a cross position where the magnitude relationship switches between the torque of the energization phases before the switching and the torque of the energization phases after the switching can be regarded as a "torque decrease region". In the present embodiment, the energization phases are switched on the earlier side than the cross position where the magnitude relationship switches between the torque of the energization phases before switching and the torque of the energization phases after switching. In other words, on the earlier side than the cross position, the energization pattern before switching can output a larger torque.

Herein, when the motor 10 stops at a balance point B where load torque and motor torque are balanced, there is a possibility that the motor 10 cannot resume due to insufficient torque even when energization is performed in the regular pattern. For example, when the rotor rotates at a low speed, the rotor easily stops. In addition, factors that cause the rotor to decelerate include an increase in load torque due to detent torque or friction, a change in power supply voltage, brake control, and the like.

Figure 5:
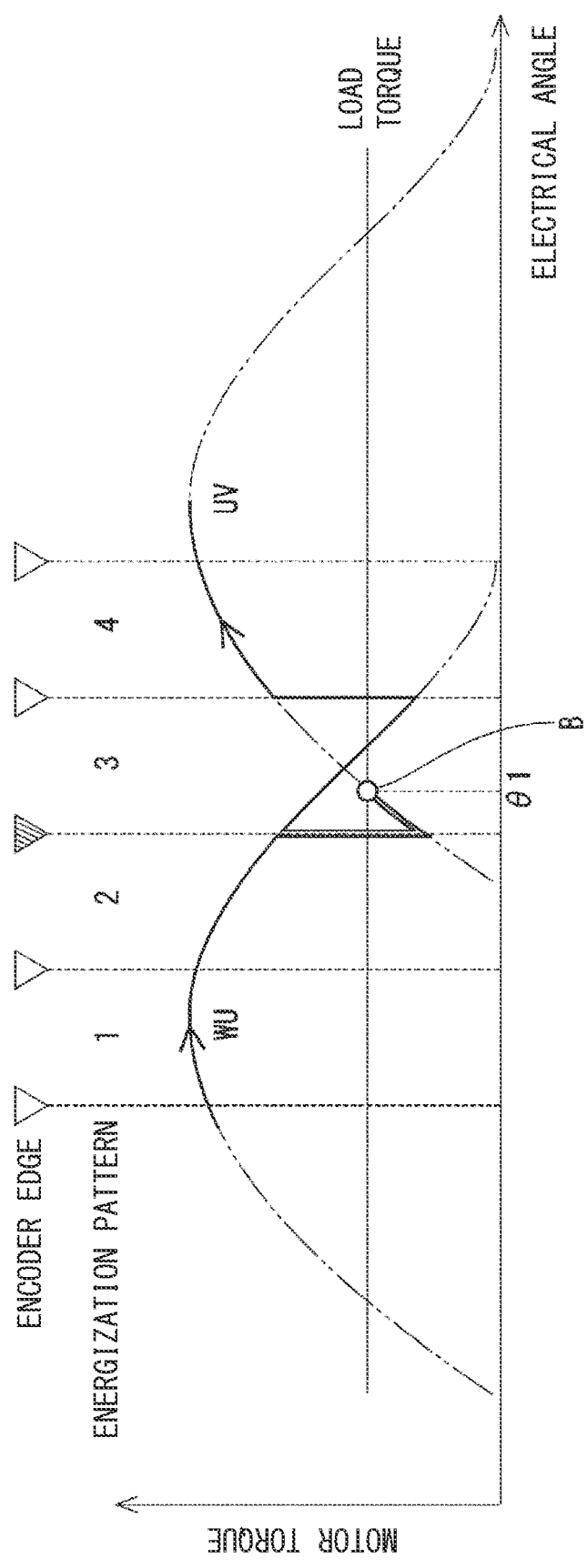
FIG. 5 is an explanatory diagram for explaining control during a motor standstill according to the first embodiment.

Therefore, in the present embodiment, as shown in FIG. 5, when the motor 10 comes to the standstill in an energization pattern in which the motor torque drops, de-energization is performed to use the load torque and return the motor 10 to an angle at which the torque is reliably output. When the encoder edge is detected, the energization is resumed in an energization pattern different from the regular pattern by setting the energization pattern back by one.

Assuming that the encoder count value at the time of motor standstill is a standstill count value Cst, the energization pattern is returned to the regular pattern when the motor 10 advances to Cst+1.

In the present embodiment, when the encoder count value Cen is n, energization in an energization pattern corresponding to n is defined as "energization in a regular pattern", energization in an energization pattern corresponding to (n−1) is defined as "setting the energization pattern back by one", and energization in an energization pattern corresponding to (n+1) is defined as "setting the energization pattern forward by one". That is, in the example of FIG. 5, at an electrical angle θ1, "energization in the regular pattern" is the UV-phase energization corresponding to the energization pattern P3, and "setting the energization pattern back by one" is the WU-phase energization corresponding to the energization pattern P2.

Figure 6:
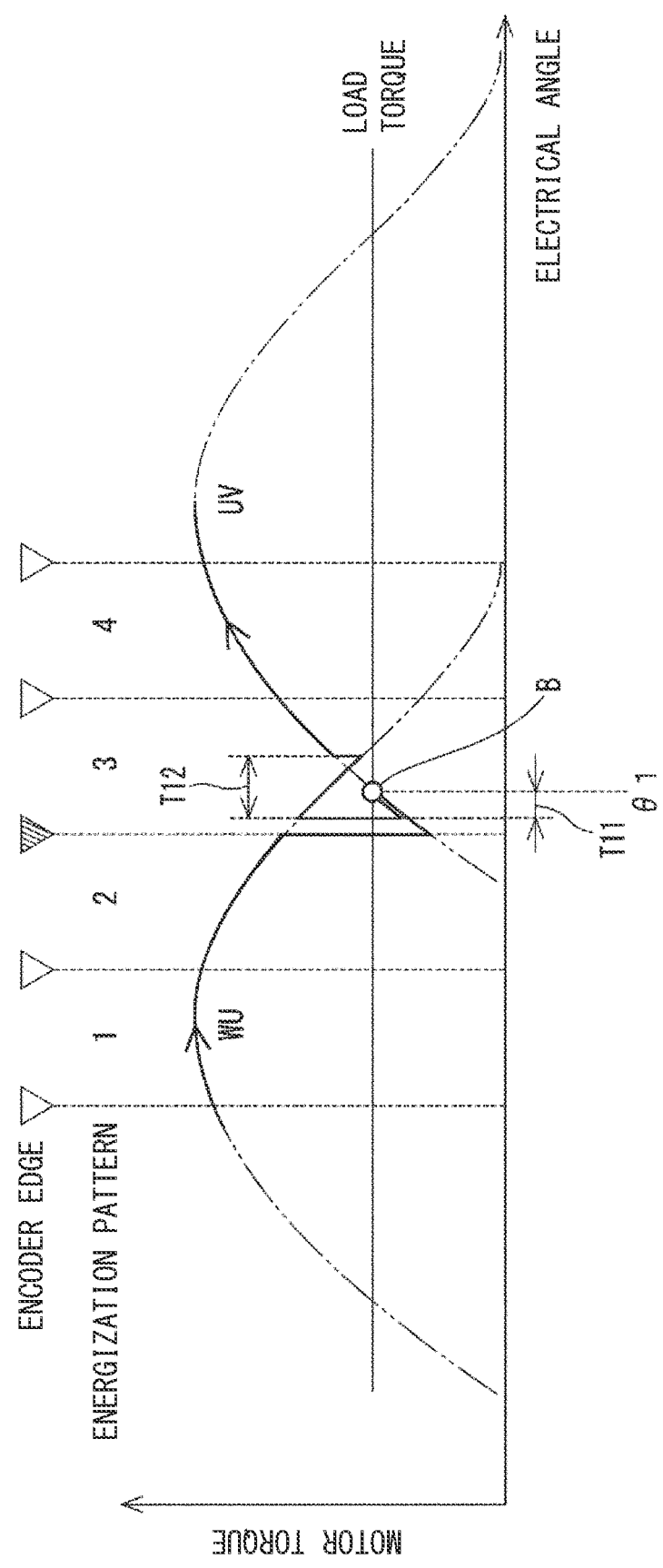
FIG. 6 is an explanatory diagram for explaining control during the motor standstill according to the first embodiment.

As shown in FIG. 6, for example, in a case where the friction is large, the motor 10 returns slowly even when de-energization is performed, and in a case where the encoder edge is not detected, the energization pattern is set back by one when a de-energization duration T11 has elapsed since the motor standstill. When the energization back duration T12 has elapsed since the setting back of the energization pattern by one, the energization pattern is returned to the regular pattern. For the sake of explanation, the lines are appropriately separated to the extent that the lines can be distinguished from each other.

Figure 7:
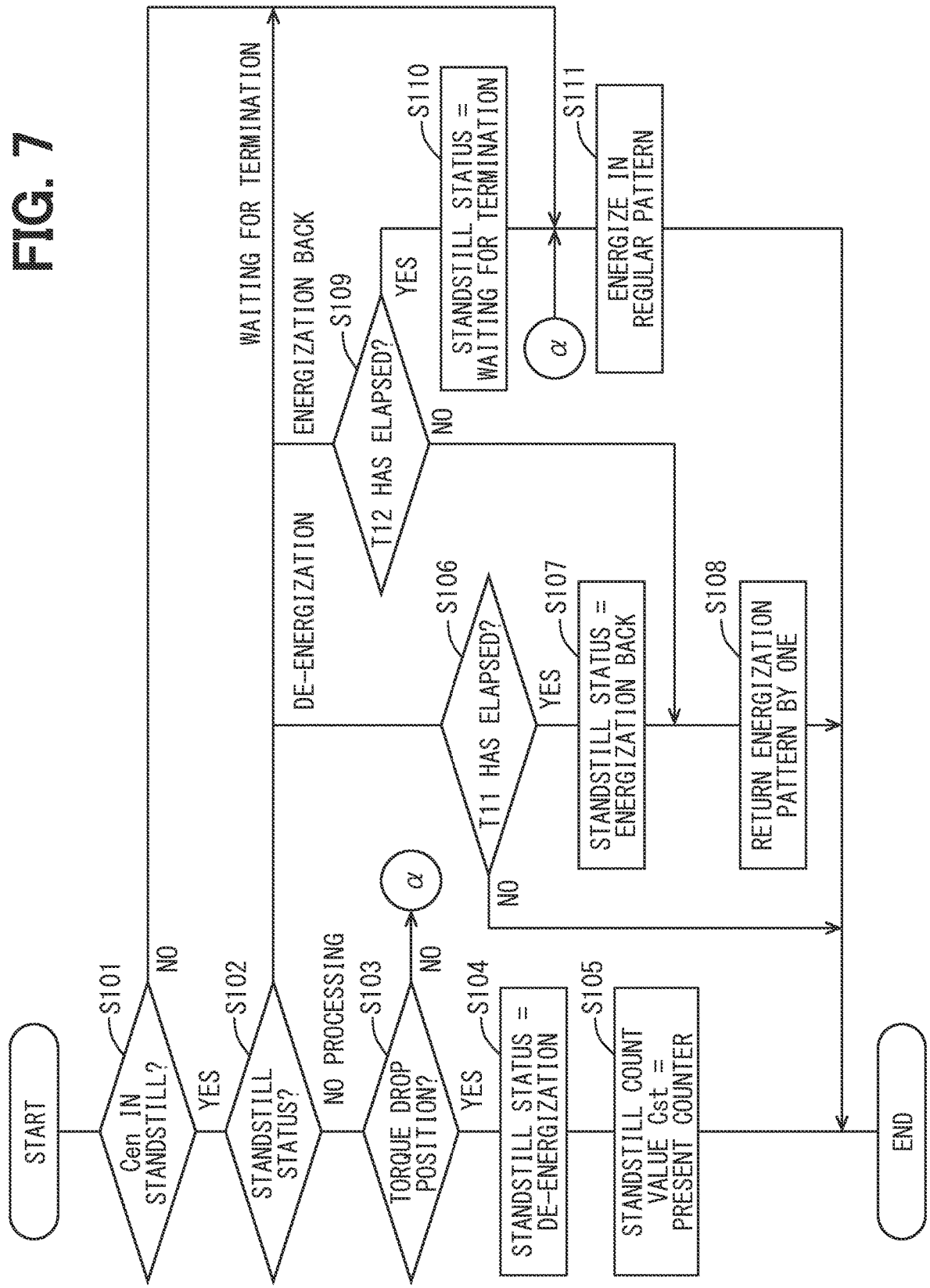
FIG. 7 is a flowchart for explaining energization control processing according to the first embodiment.
Figure 8:
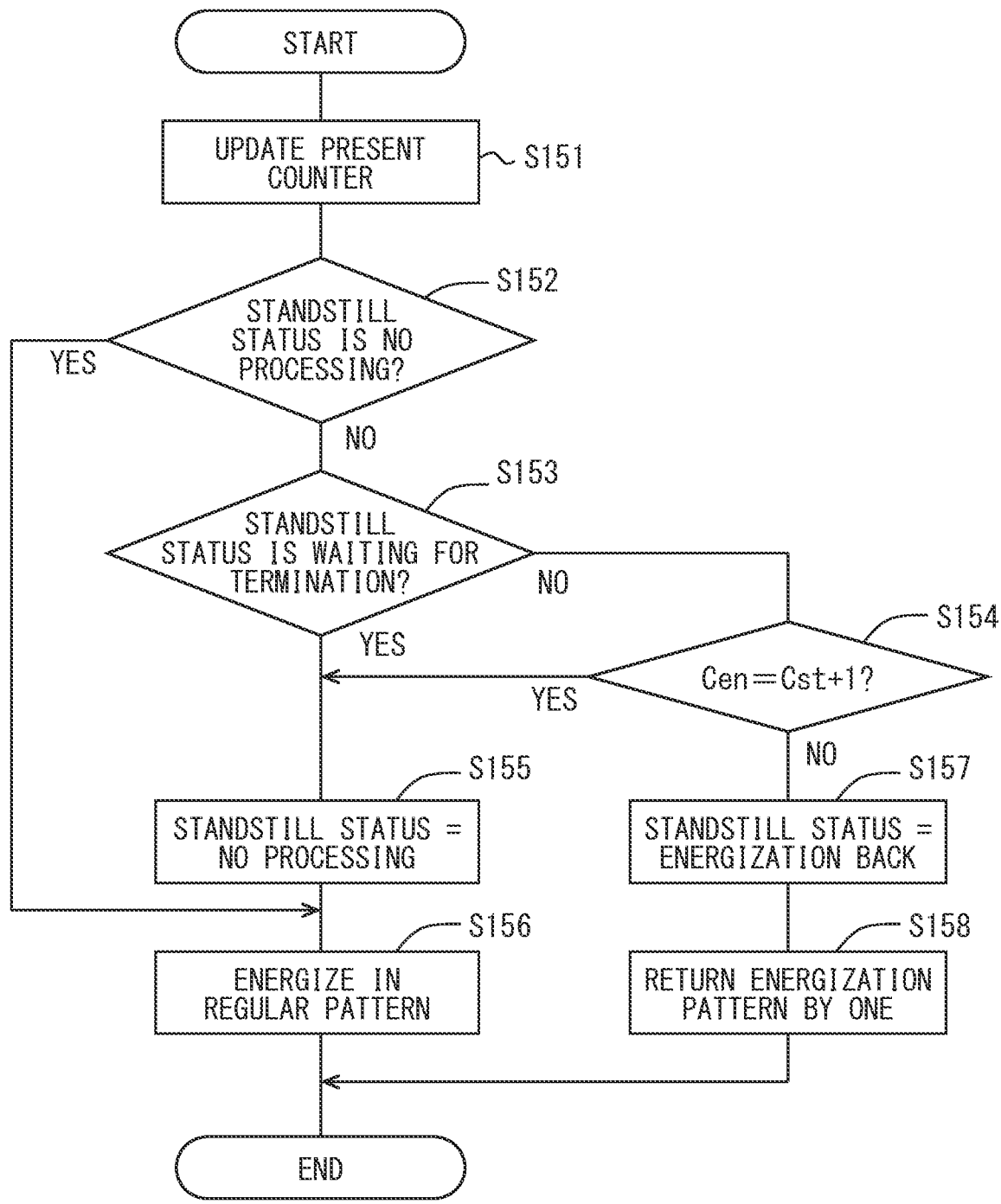
FIG. 8 is a flowchart for explaining energization control processing according to the first embodiment.

The energization control processing of the present embodiment will be described based on flowcharts of FIGS. 7 and 8. This processing is processing performed by the ECU 50, the processing in FIG. 7 is performed at a predetermined cycle (e.g., 1 [ms]), and the processing in FIG. 8 is performed by encoder edge interrupt. Hereinafter, "step" in step S101 is omitted and simply referred to as symbol "S." This also applies to the other steps. In the present embodiment, a description will be given on the assumption that the motor 10 is rotated in a positive direction except for the return due to de-energization. When the motor 10 is rotated in a reverse direction, the positive-negative relation of the encoder count value Cen is reversed. That is, when the motor 10 rotates reversely, "+1" may be replaced with "−1" and "−1" may be replaced with "+1".

In S101, the standstill determination unit 53 determines whether or not the encoder count value Cen is in a standstill. In the present embodiment, when the encoder count value Cen remains unchanged over a standstill determination time T10, it is determined that the encoder count value Cen comes to a standstill.

When it is determined that the encoder count value Cen is not in a standstill (S101: NO), the processing proceeds to S111, and the energization phases of the regular pattern corresponding to the present encoder pattern are energized. When it is determined that the encoder count value Cen is in a standstill (S101: YES), the processing proceeds to S102.

In S102, the ECU 50 determines a standstill status. The standstill status includes "no processing" in a case where the standstill processing is not performed, "de-energization" in a state where the switching elements 411 to 413 are off, "energization back" in a state where the energization pattern has been set back by one, and "waiting for termination" in a state after the standstill processing is terminated. The processing proceeds to S103 when the standstill status is "no processing", S106 when the standstill status is "de-energization", S109 when the standstill status is "energization back", and S111 when the standstill status is "waiting for termination".

In S103, the ECU 50 determines whether or not the standstill position of the motor 10 is the torque drop position. As described with reference to FIGS. 4A and 4B, since the motor torque drops when the energization patterns are P3, P7, and P11, an affirmative determination is made when the energization patterns corresponding to the present encoder count value Cen are P3, P7, and P11, and a negative determination is made in other cases. In the reverse rotation of the motor 10, since the motor torque drops in the energization patterns P2, P6, and P10, an affirmative determination is made when the energization patterns are P2, P6, and P10, and a negative determination is made in other cases. When it is determined that the standstill position of the motor 10 is not the torque drop position (S103: NO), the processing proceeds to S111, and the energization phases of the regular pattern corresponding to the present encoder count value Cen are energized. When it is determined that the standstill position of the motor 10 is the torque drop position (S103: YES), the processing proceeds to S104.

In S104, the energization control unit 51 sets the standstill status to "de-energization" and turns off the switching elements 411 to 413. Further, measurement of an elapsed time since the setting of the standstill status to "de-energization" is started. In S105, the ECU 50 holds the present encoder count value Cen as the standstill count value Cst in a storage unit such as a RAM (not shown). Hereinafter, the present encoder count value is appropriately referred to as a "present counter".

In S106 to which the processing proceeds when the standstill status is de-energization, the ECU 50 determines whether or not the de-energization duration T11 has elapsed since the setting of the standstill status to "de-energization". When it is determined that the de-energization duration T11 has not elapsed (S106: NO), the processing of S107 and thereafter are not performed, and the de-energization is continued. When it is determined that the de-energization duration T11 has elapsed (S106: YES), the processing proceeds to S107, the standstill status is set to "energization back", and an elapsed time since the setting of the standstill status to "energization back" is measured. The energization control unit 51 sets the energization pattern back by one in S108. When the energization pattern has already been set back by one, this state is continued.

In S109 to which the processing proceeds when the standstill status is "power restoration", the ECU 50 determines whether or not an energization back duration T12 has elapsed since the setting of the standstill status to "power restoration". When it is determined that the energization back duration T12 has not elapsed (S109: NO), the processing proceeds to S108, and the state in which the energization pattern is set back by one is continued. When it is determined that the energization back duration T12 has elapsed (S109: YES), the processing proceeds to S110, and the standstill status is set to "waiting for termination". In S111, the ECU 50 energizes the energization phases of the regular pattern corresponding to the present encoder count value Cen.

Energization control processing by encoder edge interrupt will be described with reference to a flowchart of FIG. 8. In S151, the ECU 50 updates the encoder count value Cen. In S152, the ECU 50 determines whether or not the energization status is no processing. When it is determined that the standstill status is "no processing" (S152: YES), the processing proceeds to S156. When it is determined that the standstill status is except for "no processing" (S152: NO), the processing proceeds to S153.

In S153, the ECU 50 determines whether or not the standstill status is waiting for termination. When it is determined that the standstill status is "waiting for termination" (S153: YES), the processing proceeds to S155. When it is determined that the standstill status is "de-energization" or "energization back" (S153: NO), the processing proceeds to S154.

In S154, the ECU 50 determines whether or not the present encoder count value Cen is the standstill count value Cst+1. When it is determined that the present encoder count value Cen is not the standstill count value Cst+1 (S154: NO), the processing proceeds to S157. When it is determined that the present encoder count value Cen is the standstill count value Cst+1 (S154: YES), the processing proceeds to S155.

In S155, the ECU 50 switches the standstill status to "no processing". In S156, the energization control unit 51 energizes the energization phases of the regular pattern corresponding to the present encoder count value Cen.

In S157 to which the processing proceeds when it is determined that the present encoder count value Cen is not the standstill count value Cst+1 (S154: NO), the ECU 50 sets the standstill status to energization back. In S158, the energization control unit 51 sets the energization pattern back by one. When the energization pattern has already been set back by one, this state is continued.

Figure 9:
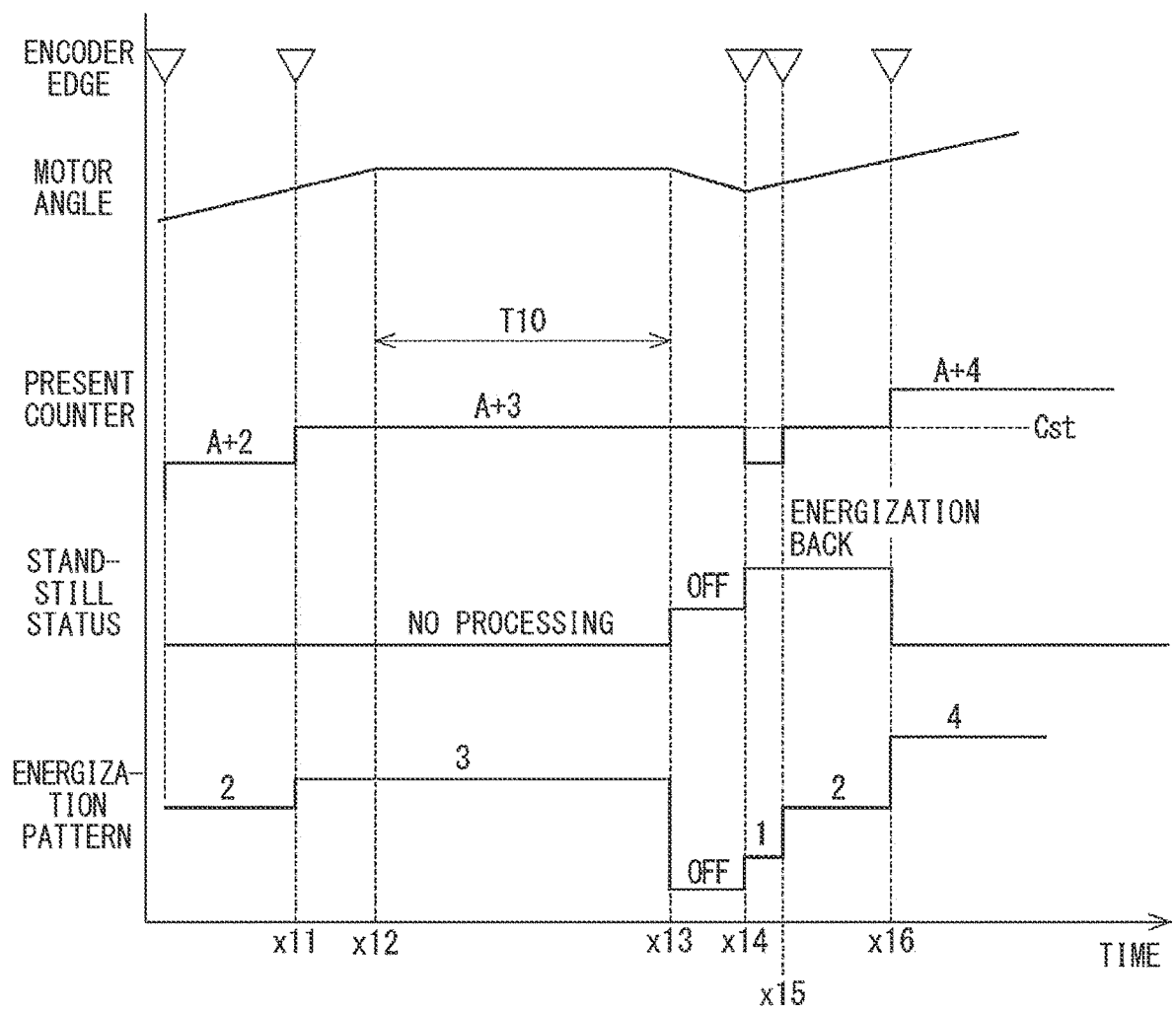
FIG. 9 is a time chart for explaining energization control processing according to the first embodiment.

The energization control processing of the present embodiment will be described based on time charts of FIGS. 9 and 10. In FIG. 9, an encoder edge, a motor angle, a present counter, a standstill status, and an energization pattern are shown from the top. This also applies to FIG. 10 and time charts according to embodiments to be described later. The present counter is described so that a value corresponding to the energization pattern P0 is A, and a portion of "k" in (A +k) corresponds to the regular energization pattern. In FIG. 4B and the like, the encoder edge at the position where the energization phases change in the regular pattern is hatched. However, in the energization back control, the switching of the energization phases does not necessarily coincide with the encoder edge timing, and thus hatching is not described in the time chart.

As shown in FIG. 9, the encoder edge is detected at time x11, the present counter is updated from A+2 to A+3, and the motor 10 stops at time x12 when the present counter is A+3. The energization pattern at this time is the pattern P3, which is the torque drop position. When a state where the encoder count value Cen is not updated from A+3 continues for the standstill determination time T10, the standstill status is switched from "no processing" to "de-energization" at time x13, and the switching elements 411 to 413 are turned off. The standstill count value Cst is set to A+3.

When de-energization is performed, the motor 10 is returned in reverse direction to the rotational direction before the standstill by the load torque. When the encoder edge is detected at time x14, the present counter is set to A+2, the standstill status is switched from "de-energization" to "energization back", and the energization pattern is set back by one. That is, since the present counter is A+2, the pattern P1 as an energization pattern corresponding to (A+2)−1, that is, the WU-phase energization, is applied.

When the encoder edge is detected at time x15, and the present counter is updated to A+3, the energization pattern is set to the pattern P2 corresponding to (A+3)−1. With both the patterns P1, P2 being the WU-phase energization, the WU-phase energization is continued.

When the encoder edge is detected at time x16, the present counter is updated to A+4. Herein, since the standstill count value Cst=A+3 and the present counter is the standstill count value Cst+1 (=A+3+1), the standstill status is switched from "energization back" to "no processing". In addition, the energization pattern is set to the pattern P4 that is the regular pattern, and the WU-phase energization is switched to the UV-phase energization.

Figure 10:
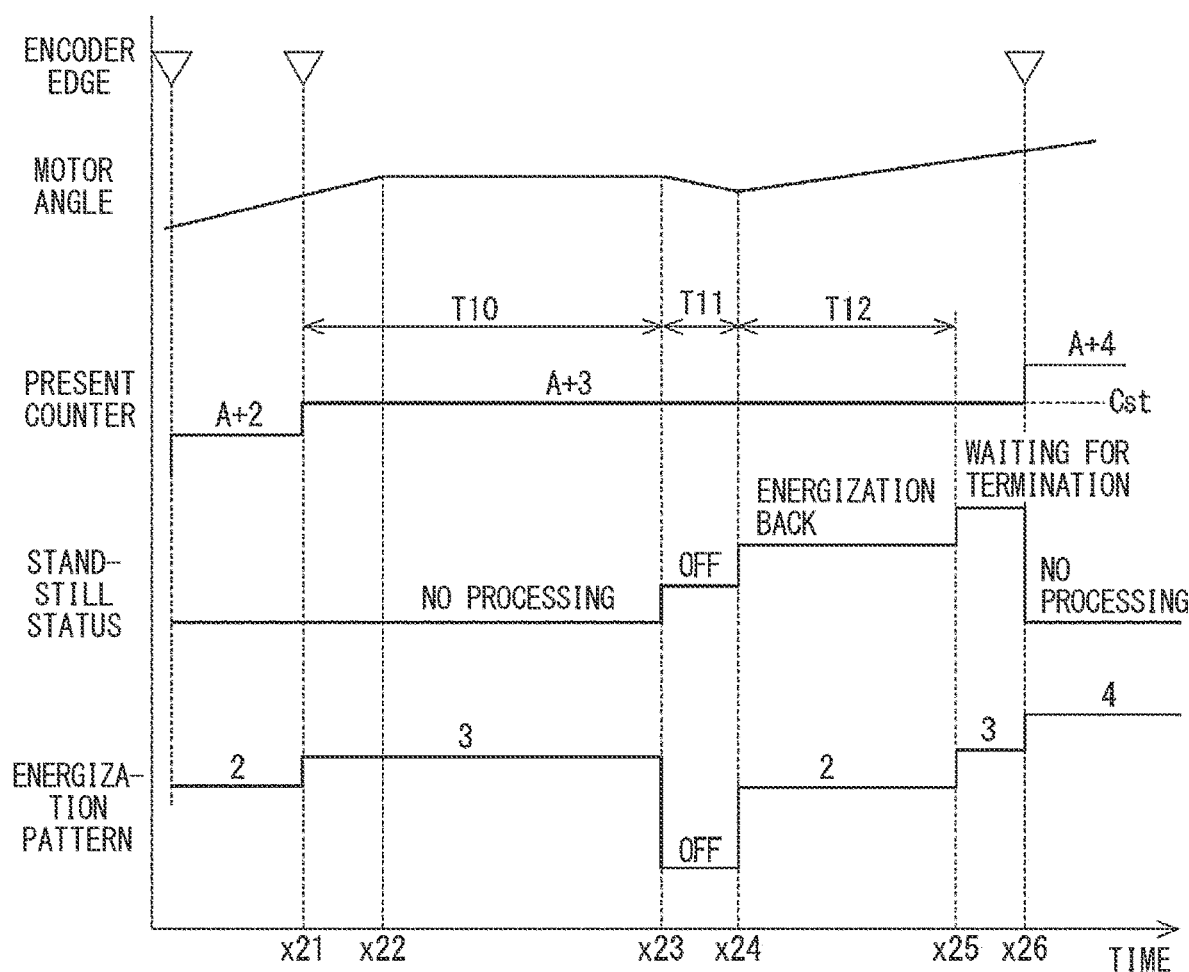
FIG. 10 is a time chart for explaining energization control processing according to the first embodiment.

The processing from time x21 to time x23 in FIG. 10 is the same as the processing from time x11 to time x13 in FIG. 9. At time x23, the motor 10 is returned by de-energization, but in a case where the return is slow, such as a case where the friction is large, it takes time for the motor 10 to return to the encoder edge. In this case, the standstill status is switched from "de-energization" to "energization back" at time x24 when the de-energization duration T11 has elapsed since the setting of the standstill status to de-energization. That is, since the present counter is A+3, the pattern P2 as an energization pattern corresponding to (A+3)−1, that is, the WU-phase energization, is applied.

The energization status is switched from "energization back" to "waiting for termination", and the energization pattern is switched to the pattern P3 as the regular pattern, that is, the UV-phase energization, at time x24 when the energization back duration T12 has elapsed since time x25 when the energization status was switched to the energization back.

When the encoder edge is detected at time x26 while the standstill stator is in the "waiting for termination" state, the present counter is updated to A+4, and the energization status is switched from "waiting for termination" to "no processing". The energization pattern is set to the pattern P4. With both the patterns P3, P4 being the UV-phase energization, the UV-phase energization is continued. In a case where the encoder edge is detected before the time x25 when the energization back duration T12 has elapsed, and the present count is updated to A+4, the regularity return is performed at a timing before the time x25.

As a result, even when the motor 10 stops, the motor 10 can be appropriately resumed by making the energization phases different from those in the regular pattern and selecting an energization pattern with more torque. When the motor 10 cannot be driven to the advanced angle side from the standstill position even with such control, it is determined that the stop is caused by another factor (e.g., a wall position at the time of wall contact control, a mechanical lock abnormality, etc.), and another processing may be performed appropriately.

As described above, the shift range control device 40 controls the drive of the motor 10 including the motor winding 11, and the ECU 50 includes the energization control unit 51 and the standstill determination unit 53. The energization control unit 51 controls the energization of the motor winding 11 in accordance with the detection value of the encoder 13 that detects the rotational position of the motor 10. The standstill determination unit 53 detects the standstill of the motor 10.

When the standstill of the motor 10 is detected, the energization control unit 51 controls the energization in a change pattern which is an energization pattern different from the preset regular pattern in accordance with the detection value of the encoder 13. In the present embodiment, the regular pattern is set in accordance with the encoder count value Cen. As a result, even when the motor 10 comes to a standstill due to, for example, insufficient torque, the motor 10 can be resumed by changing the energization pattern and changing the generated torque.

When the standstill of the motor 10 is detected, the energization control unit 51 performs de-energization, and subsequently resumes the energization according to the change pattern. De-energization is performed, the rotational position of the motor 10 is changed using the load torque, and the energization pattern is changed, thus enabling the motor 10 to be resumed more reliably from a rotational position where relatively large torque can be output.

When the rotational position returns to the energization resumption position after the de-energization, the energization control unit 51 resumes the energization in the change pattern. In the present embodiment, the energization resumption position is a position where the encoder edge is detected on the retarded angle side from the standstill position. As a result, the motor 10 can be resumed at an optimum position.

The energization control unit 51 resumes the energization in the change pattern when the de-energization duration T11 has elapsed since the de-energization. As a result, even in a case where the motor 10 returns slowly when, for example, the load torque is large, it is possible to appropriately switch the pattern to the change pattern.

In the present embodiment, the change pattern is an energization pattern on the retarded angle side of the standstill position of the motor 10. In the present specification, the rotational direction side before the motor 10 comes to a standstill is defined as a reference rotational direction, a forward side in the reference rotational direction from the standstill position is defined as an "advanced angle side", and a backward side is defined as a "retarded angle side". Specifically, when the energization pattern is set back by one, and the present counter is set to n, energization is performed in an energization pattern corresponding to (n−1). As a result, it is possible to change the generated torque and appropriately resume the motor 10.

The energization control unit 51 returns the pattern to the regular pattern when the motor 10 has moved from the standstill position to the return position on the advanced angle side since the start of the energization in the change pattern. In the present embodiment, the return position is a position where the encoder edge is detected on the advanced angle side of the standstill position. As a result, the energization pattern changed due to the standstill of the motor 10 can be appropriately returned to the regular pattern.

The energization control unit 51 returns the pattern to the regular pattern when the energization back duration T12 has elapsed since the start of the energization in the change pattern. As a result, it is possible to return the pattern to the regular pattern at an appropriate timing except for the encoder edge capable of detecting the angle.

The energization control unit 51 changes the energization pattern when the standstill position of the motor 10 is in the torque decrease region, and does not change the energization pattern when the standstill position of the motor 10 is not in the torque decrease region. In other words, the control to change the energization pattern is not performed in a region where the standstill position is not the torque decrease region and the effect by the change of the energization pattern is not recognized. Thus, the change control of the energization pattern can be performed appropriately. In the present embodiment, each of regions where the energization patterns are P3, P7, and P11 during the forward rotation of the motor corresponds to the "torque decrease region". Further, each of regions where the energization patterns are P2, P6, and P10 during the reverse rotation of the motor corresponds to the "torque decrease region".

Second Embodiment

Figure 11:
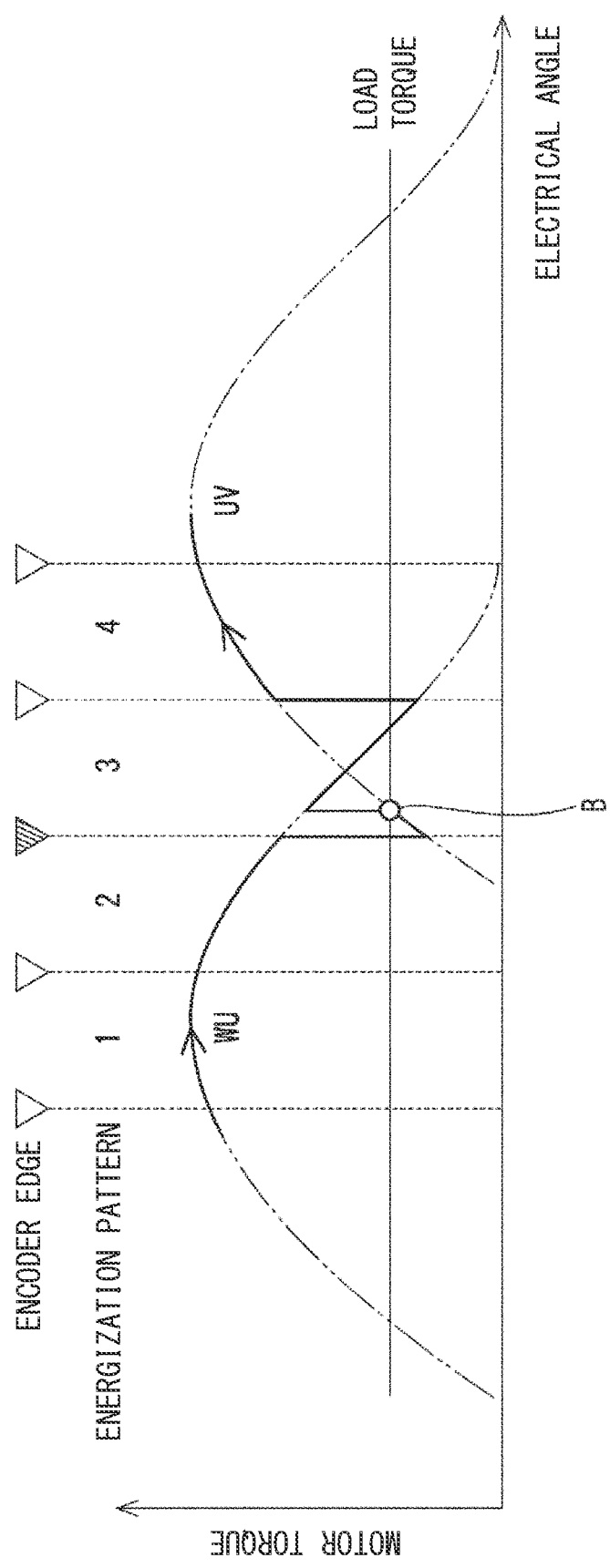
FIG. 11 is an explanatory diagram for explaining control during a motor standstill according to a second embodiment.

FIGS. 11 to 14 show a second embodiment. In the second to fourth embodiments, the energization pattern in the normal state is the same as in the first embodiment. As shown in FIG. 11, in the present embodiment, when the motor 10 comes to a standstill in the energization pattern in which the motor torque drops, the energization pattern is set back by one without de-energization. When the motor 10 advances to the standstill count value Cst+1, the energization pattern is returned to the regular pattern. The standstill status of the present embodiment is "no processing" or "energization back", and "de-energization" and "waiting for termination" are omitted.

Figure 12:
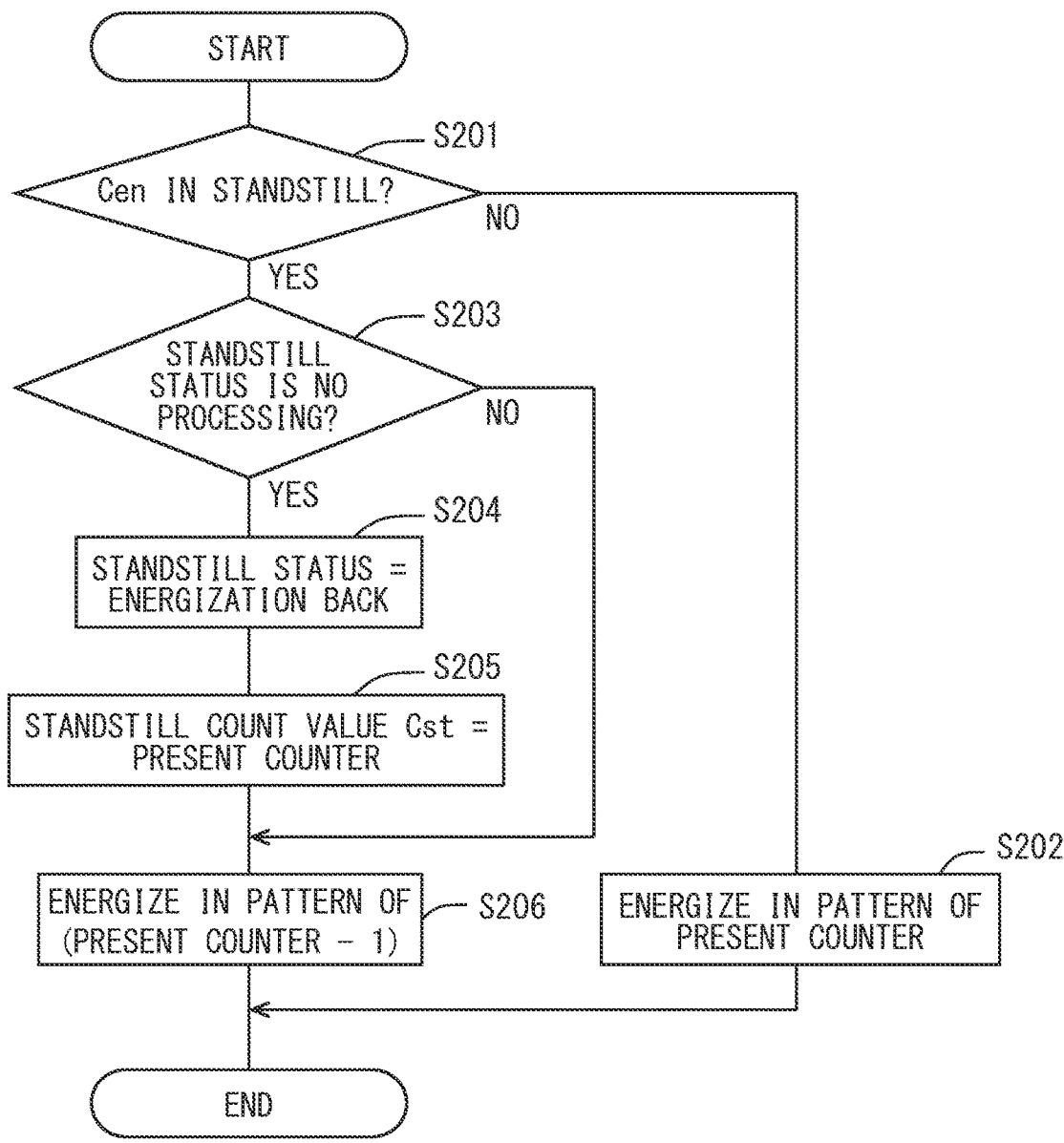
FIG. 12 is a flowchart for explaining energization control processing according to the second embodiment.
Figure 13:
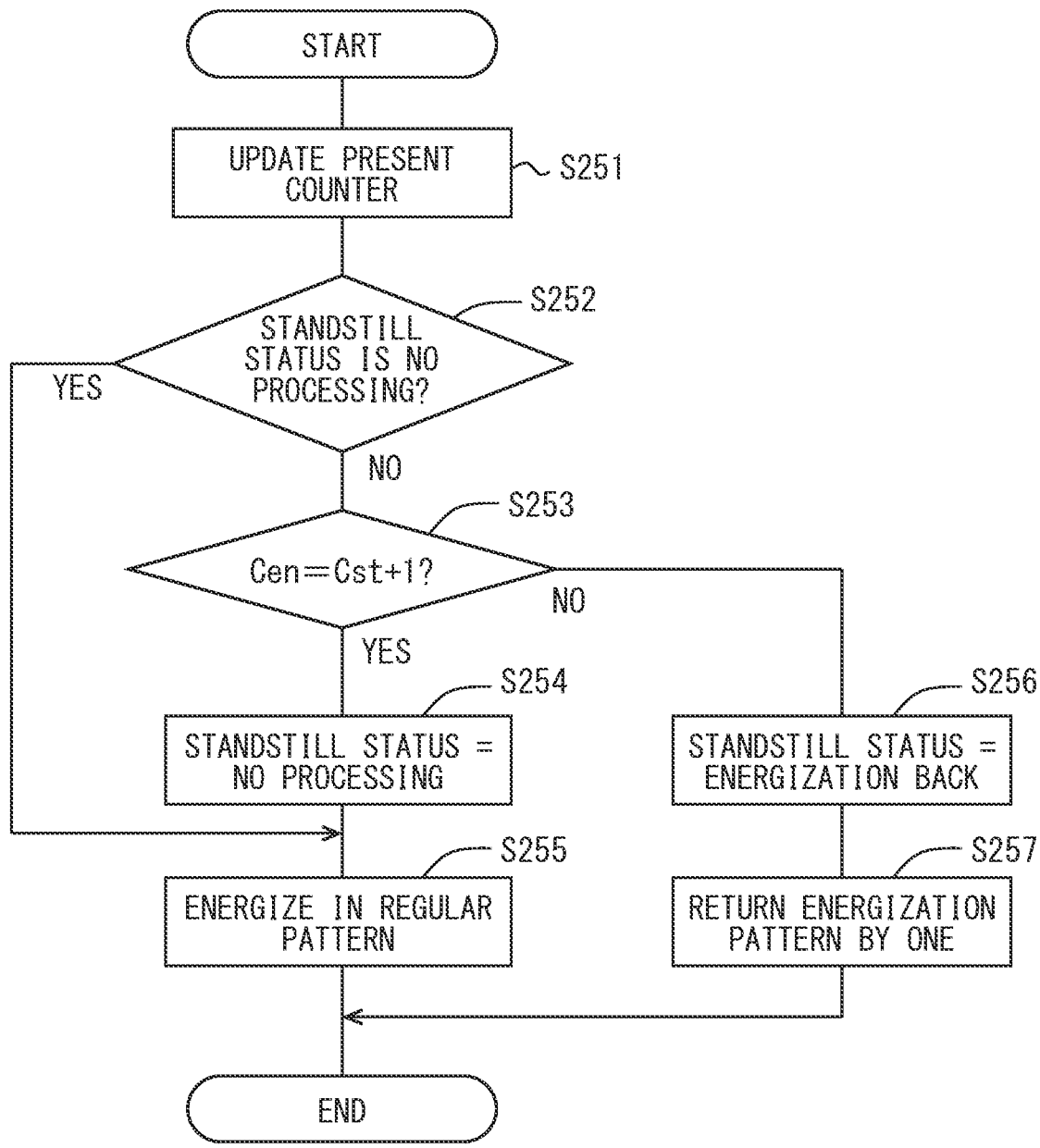
FIG. 13 is a flowchart for explaining energization control processing according to the second embodiment.

FIGS. 12 and 13 show the energization control processing of the present embodiment. This processing is processing performed by the ECU 50, the processing in FIG. 12 is performed at a predetermined cycle (e.g., 1 [ms]), and the processing in FIG. 13 is performed by encoder edge interrupt.

The processing of S201 in FIG. 12 is the same as the processing of S101 in FIG. 7, and the processing of S202 is the same as the processing of S111. In S203, the ECU 50 determines whether or not the standstill status is "no processing". When it is determined that the standstill status is "no processing" (S203: YES), the processing proceeds to S204, and when it is determined that the status is "energization back" (S203: NO), the processing proceeds to S206.

The ECU 50 switches the energization status from "no processing" to "energization back" in S204, and holds the present encoder count value Cen as the standstill count value Cst in a storage unit such as a RAM in S205. In S206, as in S108, the energization control unit 51 sets the energization phases back by one. When the energization pattern has already been set back by one, this state is continued.

The processing of S251 in FIG. 13 is the same as the processing of S151 in FIG. 8. In S252, the ECU 50 determines whether or not the standstill status is "no processing". When it is determined that the standstill status is "no processing" (S252: YES), the processing proceeds to S255, and the regular pattern is energized. When it is determined that the standstill status is "energization back" (S252: NO), the processing proceeds to S253.

The processing of S253 is the same as that of S154 in FIG. 8, and when it is determined that the present encoder count value Cen is the standstill count value Cst+1 (S253: YES), the processing proceeds to S254, and when it is determined that the present encoder count value Cen is not the standstill count value Cst+1 (S253: NO), the processing proceeds to S256. The processing of S254 to S257 is the same as the processing of S155 to S158.

Figure 14:
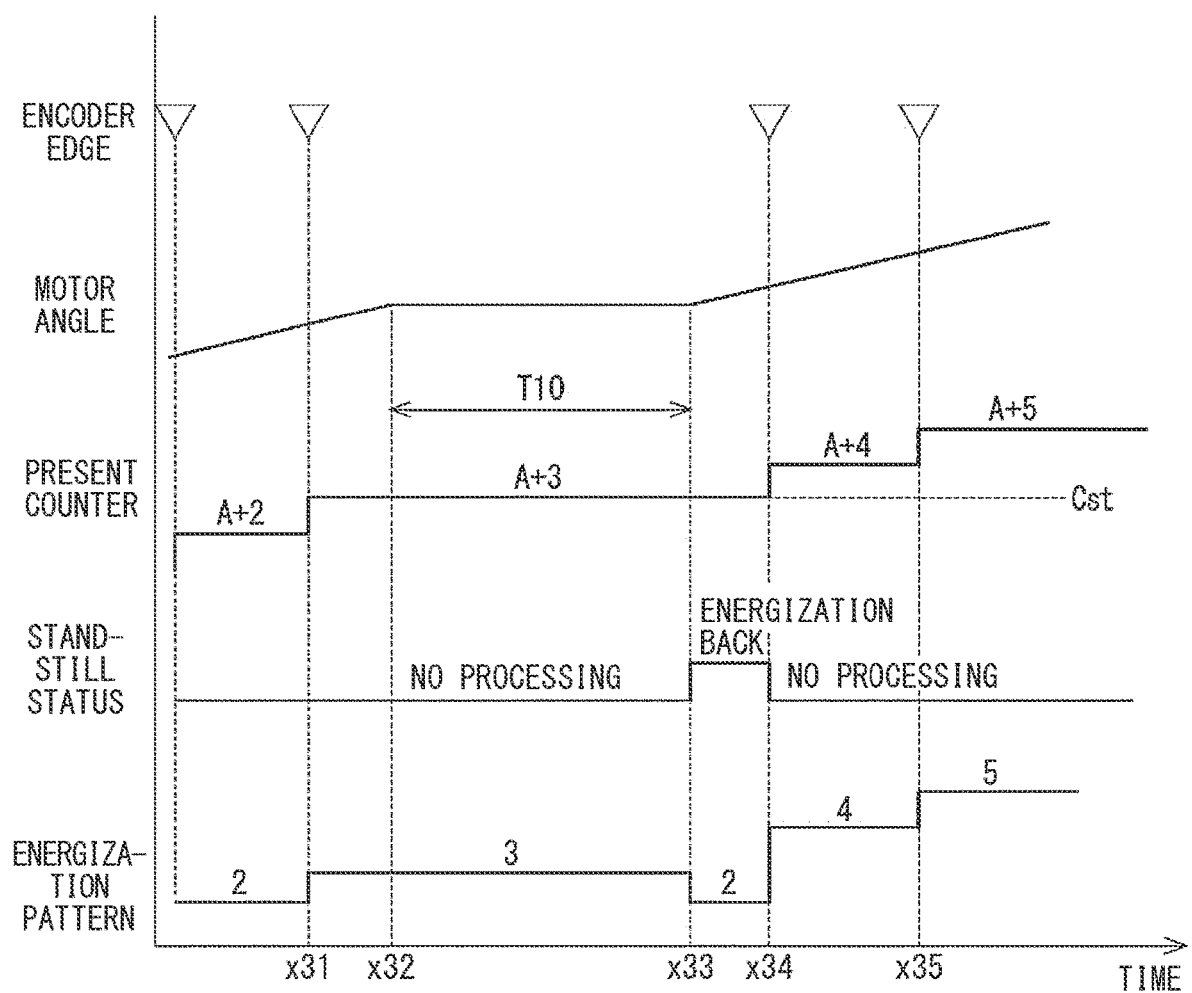
FIG. 14 is a time chart for explaining energization control processing according to the second embodiment.

The energization control processing of the present embodiment will be described based on a time chart of FIG. 14. The processing from time x31 to time x32 is the same as the processing from time x11 to time x12 in FIG. 9. At time x33, when a state where the encoder count value Cen is not updated from A+3 continues for the standstill determination time T10, the standstill status is switched from "no processing" to "energization back", and the energization pattern is set back by one. In other words, since the present counter is A+3, the pattern P2 as an energization pattern corresponding to (A+3)−1, that is, the WU-phase energization, is applied. The standstill count value Cst is set to (A+3).

When the encoder edge is detected at time x34, the encoder count value Cen is updated from A+3 to A+4. Herein, since the standstill count value Cst=A+3 and the present counter is the standstill count value Cst+1 (=A+3+1), the standstill status is switched from "energization back" to "no processing". In addition, the energization pattern is set to the pattern P4 that is the regular pattern, and the WU-phase energization is switched to the UV-phase energization. With such a configuration as well, the same effect as that of the above embodiment is exerted.

Third Embodiment

Figure 15:
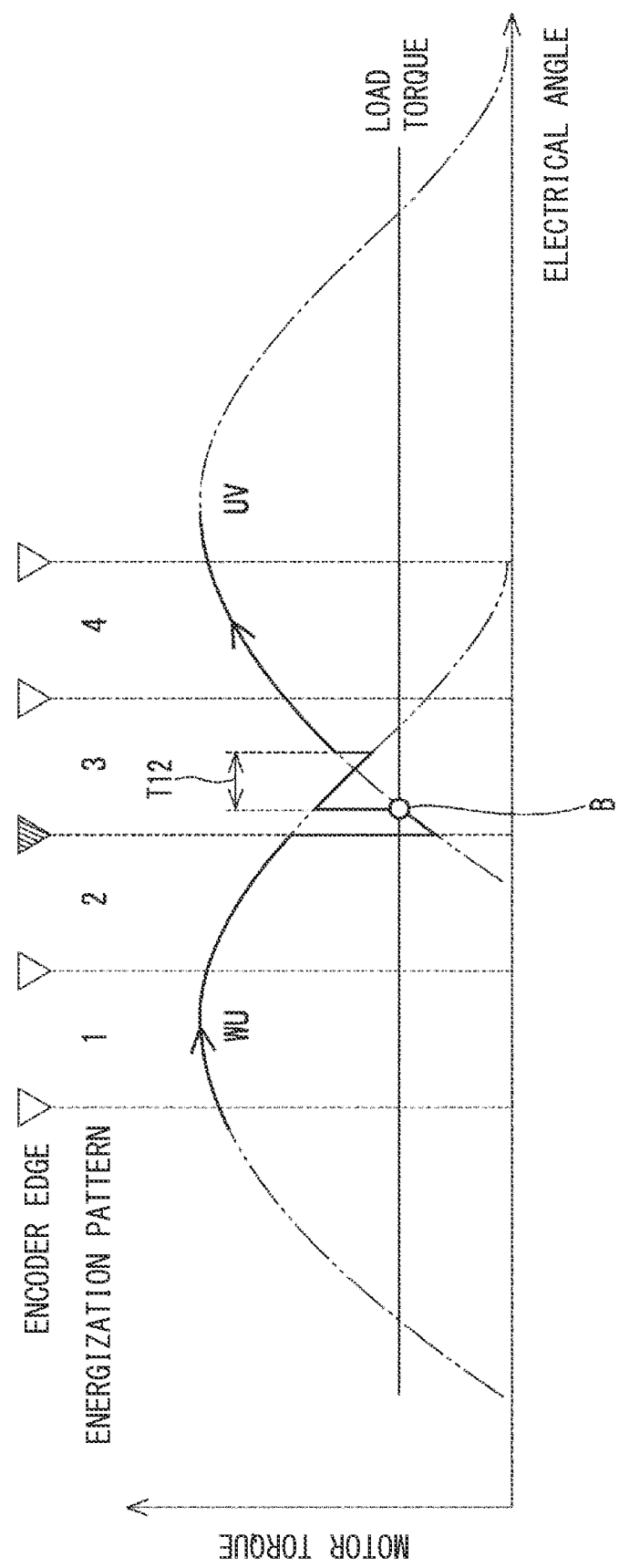
FIG. 15 is an explanatory diagram for explaining control during a motor standstill according to a third embodiment.

FIGS. 15 to 18 show a third embodiment. As shown in FIG. 15, in the present embodiment, as in the second embodiment, when the motor 10 comes to a standstill in the energization pattern in which the motor torque drops, the energization pattern is set back by one, and the standstill status is set to "energization back". When the energization back duration T12 has elapsed, the energization pattern is returned to the regular pattern. The standstill status of the present embodiment is "no processing", "energization back", or "waiting for termination", and "de-energization" is omitted.

Figure 16:
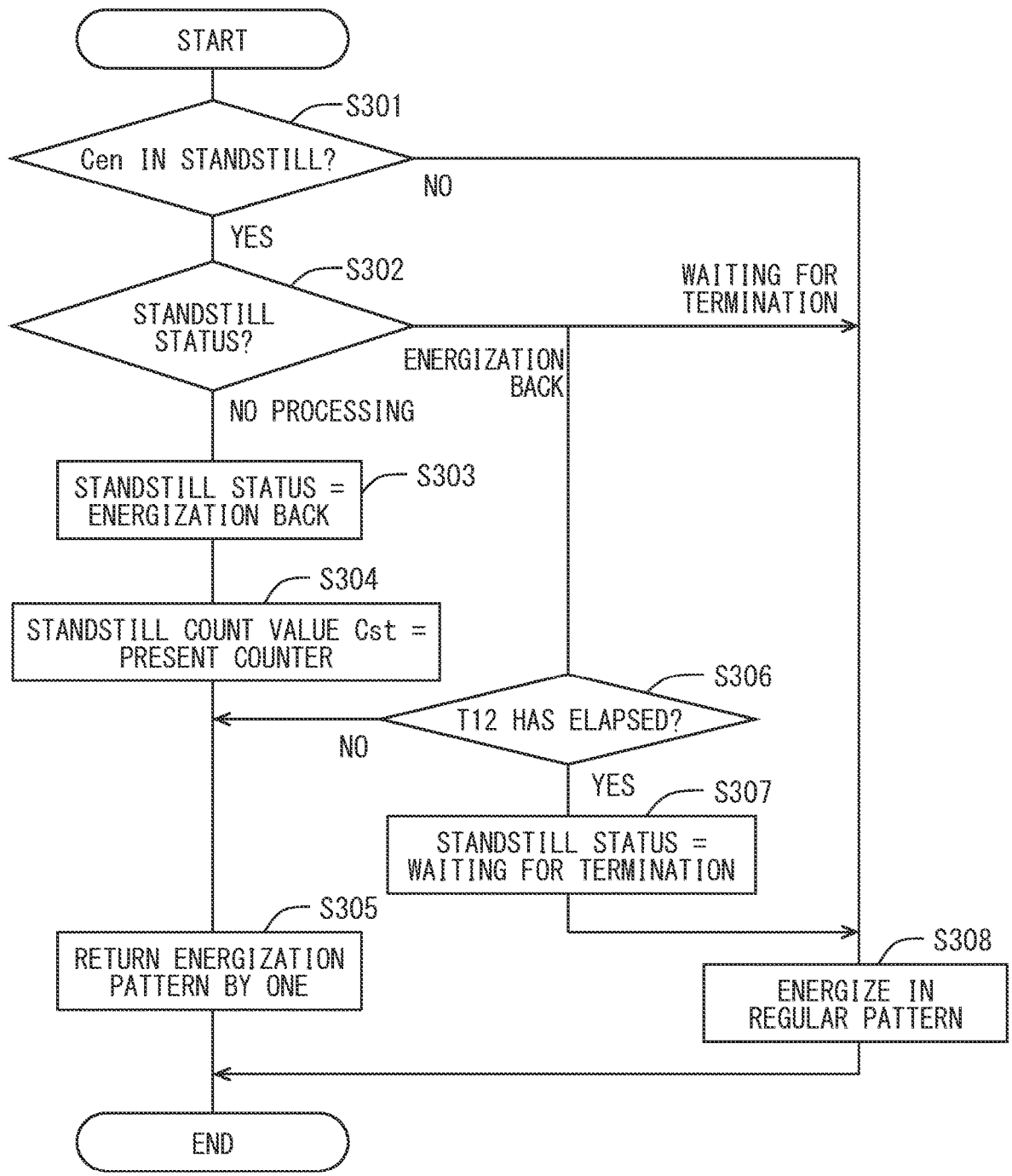
FIG. 16 is a flowchart for explaining energization control processing according to the third embodiment.

The processing of S301 in FIG. 16 is the same as the processing of S101 in FIG. 7. In S302, the ECU 50 determines a standstill status. The processing proceeds to S302 when the standstill stator is "no processing", proceeds to S306 when the stator is "energization back", and proceeds to S308 when the stator is "waiting for termination".

Figure 17:
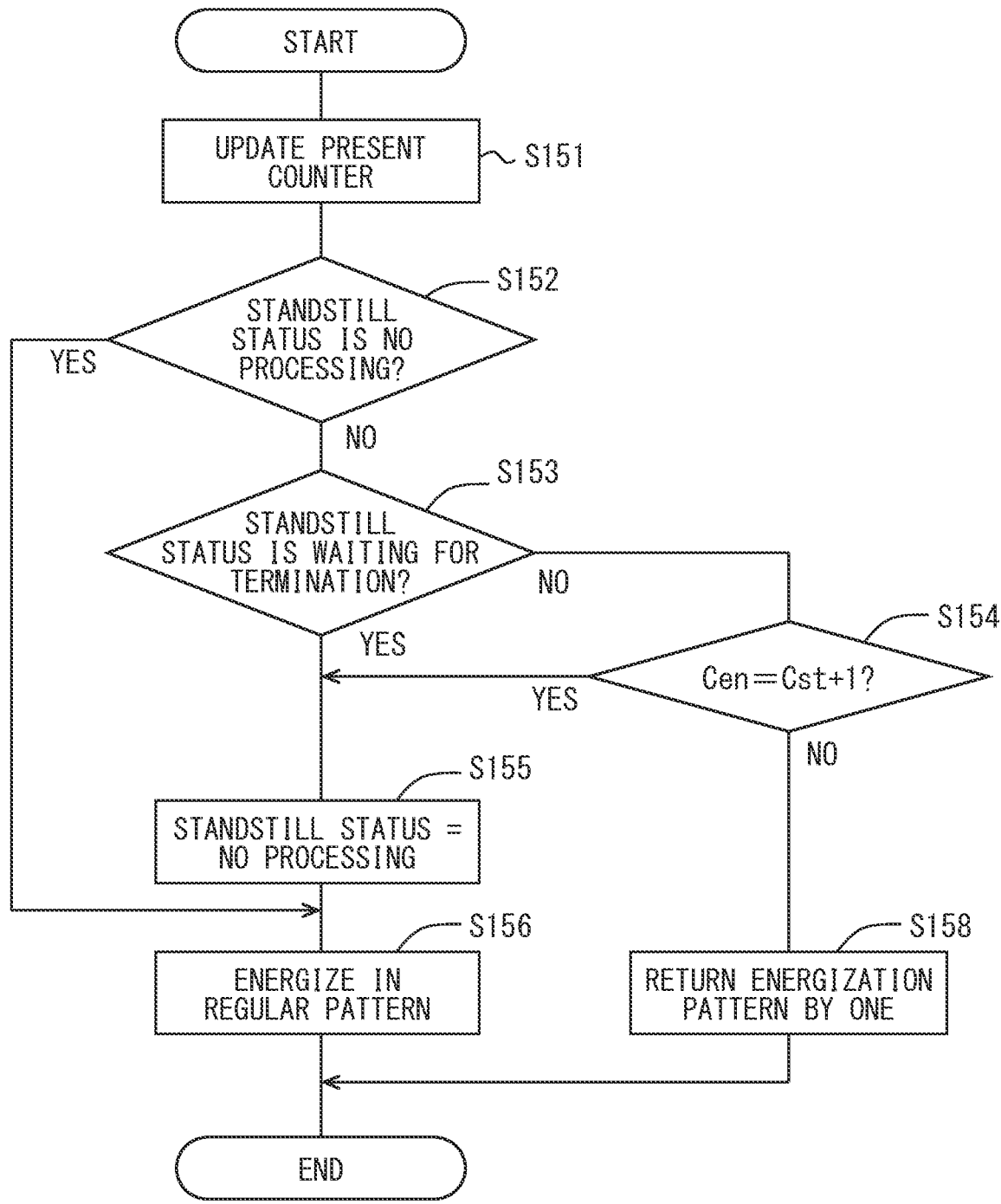
FIG. 17 is a flowchart for explaining energization control processing according to the third embodiment.

The ECU 50 sets the standstill status to "energization back" in S303 and holds the present encoder count value Cen as the standstill count value Cst in S304. In S305, the energization control unit 51 sets the energization pattern back by one. The processing of S306 to S308 is the same as the processing of S109 to S111. When a negative determination is made in S306, the processing proceeds to S305 to set back the energization pattern by one. The processing of FIG. 17 is the same as that of FIG. 8 except that the processing of S157 in FIG. 8 is omitted.

Figure 18:
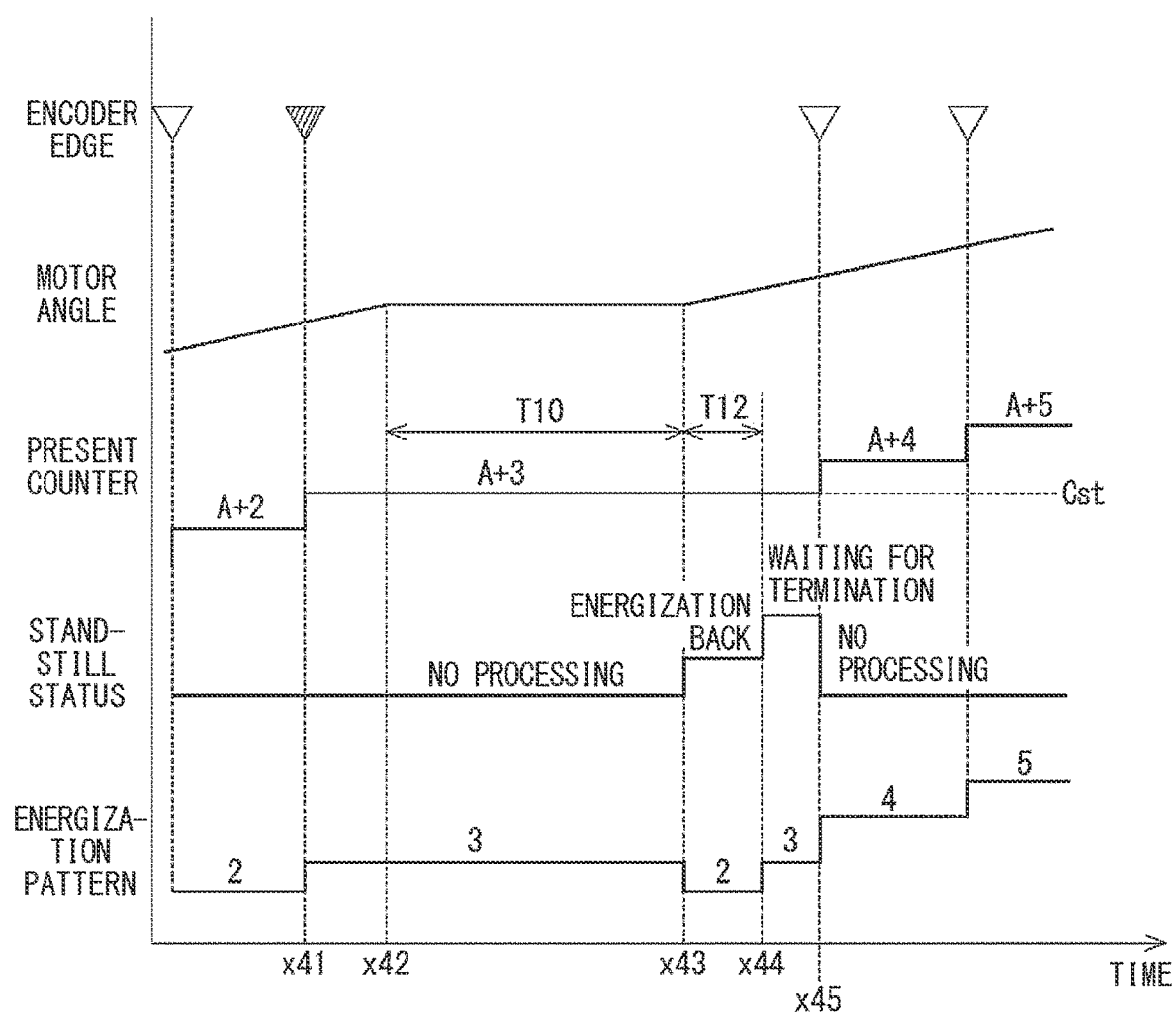
FIG. 18 is a time chart for explaining energization control processing according to the third embodiment.

The energization control processing of the present embodiment will be described based on a time chart of FIG. 18. The processing from time x41 to time x43 is the same as the processing from time x31 to time x33 in FIG. 14. At time x43 when the energization back duration T12 has elapsed since the setting back of the energization pattern by one at time x44, the standstill status is set to "waiting for termination", and the energization pattern is returned to the pattern P3 that is the regular pattern. Further, when the encoder edge is detected at time x45, the present counter is updated to A+4, and the standstill status is switched to "no processing". The energization pattern is set to the pattern P4. With such a configuration as well, the same effect as those of the above embodiments is exerted.

Fourth Embodiment

Figure 19:
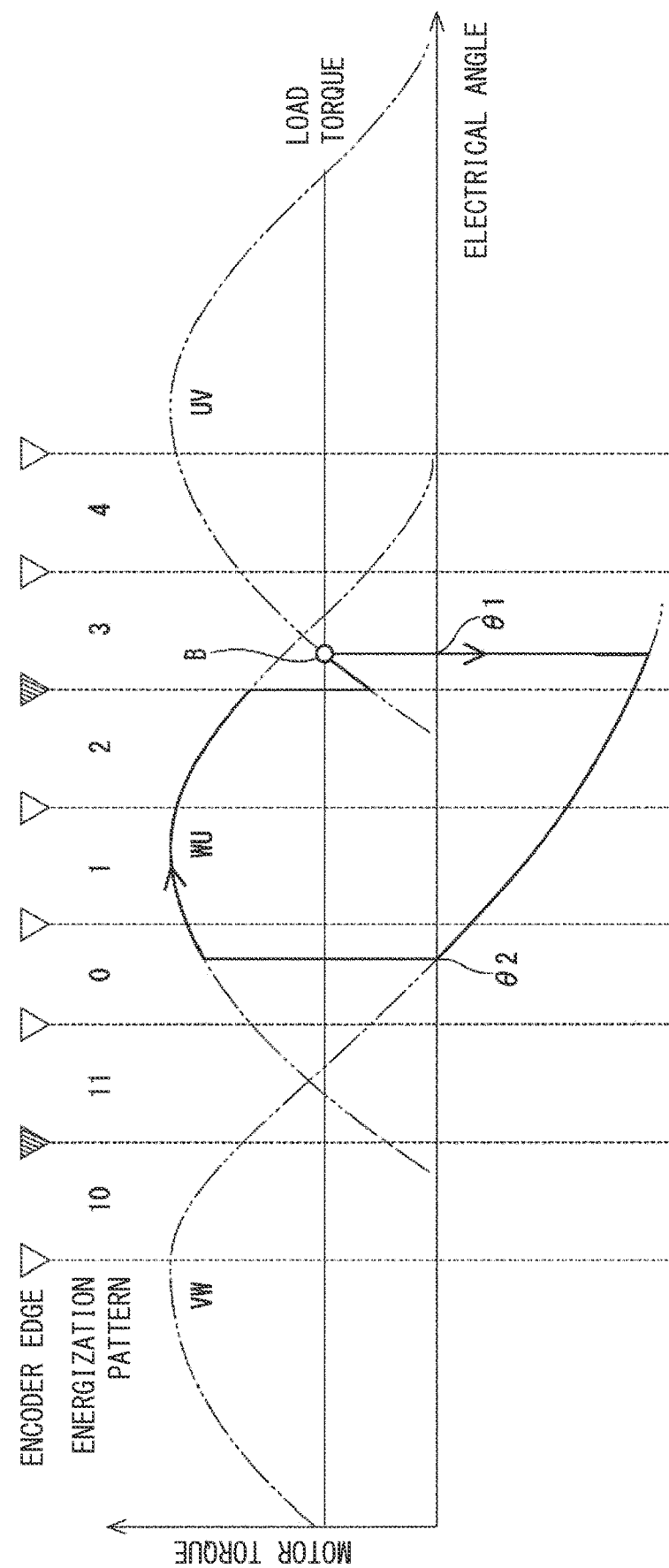
FIG. 19 is an explanatory diagram for explaining control during a motor standstill according to a fourth embodiment.

FIG. 19 shows a fourth embodiment. As shown in FIG. 19, in the present embodiment, when the motor 10 stops at a position where the motor torque drops, the energization phases with which the reverse torque is generated are energized. The rotor is returned to a lock position where the motor torque becomes 0, and the energization pattern is returned to the regular pattern. The lock position is a position where the energization phase and the rotor face each other in accordance with the number of magnetic poles of the stator and the rotor. At The lock position, relatively large torque can be generated by energization in an energizing pattern except for a pattern in which a lock current flows.

For example, when the motor 10 stops at an electrical angle θ1 that is the energization pattern P3, the UV-phase energization as the regular pattern is changed to the VW-phase energization that is the energization pattern in which reverse torque is generated, so that the rotor returns to an electrical angle θ2 that is the lock position in the VW-phase energization. After the motor is locked at the electrical angle θ2 by the VW-phase energization, switching is made to the WU-phase energization that is the regular pattern, whereby the motor 10 can be resumed with relatively large torque. When the motor is turned with momentum to be able to pass through the position where the motor stopped by the load torque, the drive of the motor 10 can be continued appropriately.

In the present embodiment, the change pattern is an energization pattern that generates torque in reversely to the rotational direction before the motor 10 comes to a standstill at the standstill position. After returning the motor 10 to the lock position, the energization control unit 51 returns the energization pattern to the regular pattern. As a result, the motor 10 can be returned to an angle at which torque is reliably output, and the motor 10 can be resumed from a position where relatively large torque can be output. Further, the same effect as those of the above embodiments is exerted.

Fifth Embodiment

Figures 20A, 20B:
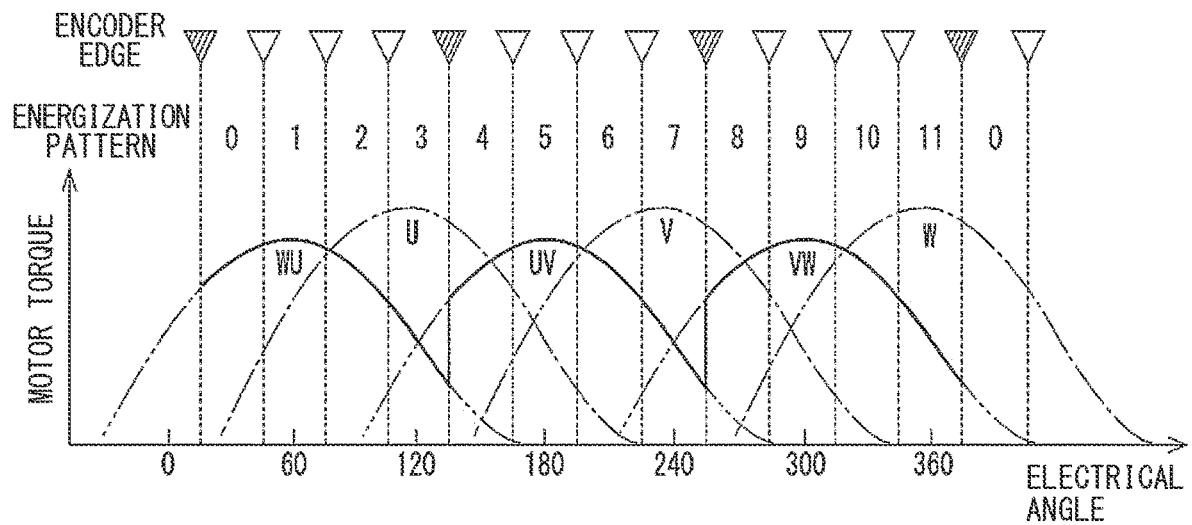
FIG. 20A is a diagram showing energization patterns and energization phases according to a fifth embodiment.
FIG. 20B is a diagram showing a relationship between an electrical angle and motor torque according to the fifth embodiment.
Figure 21:
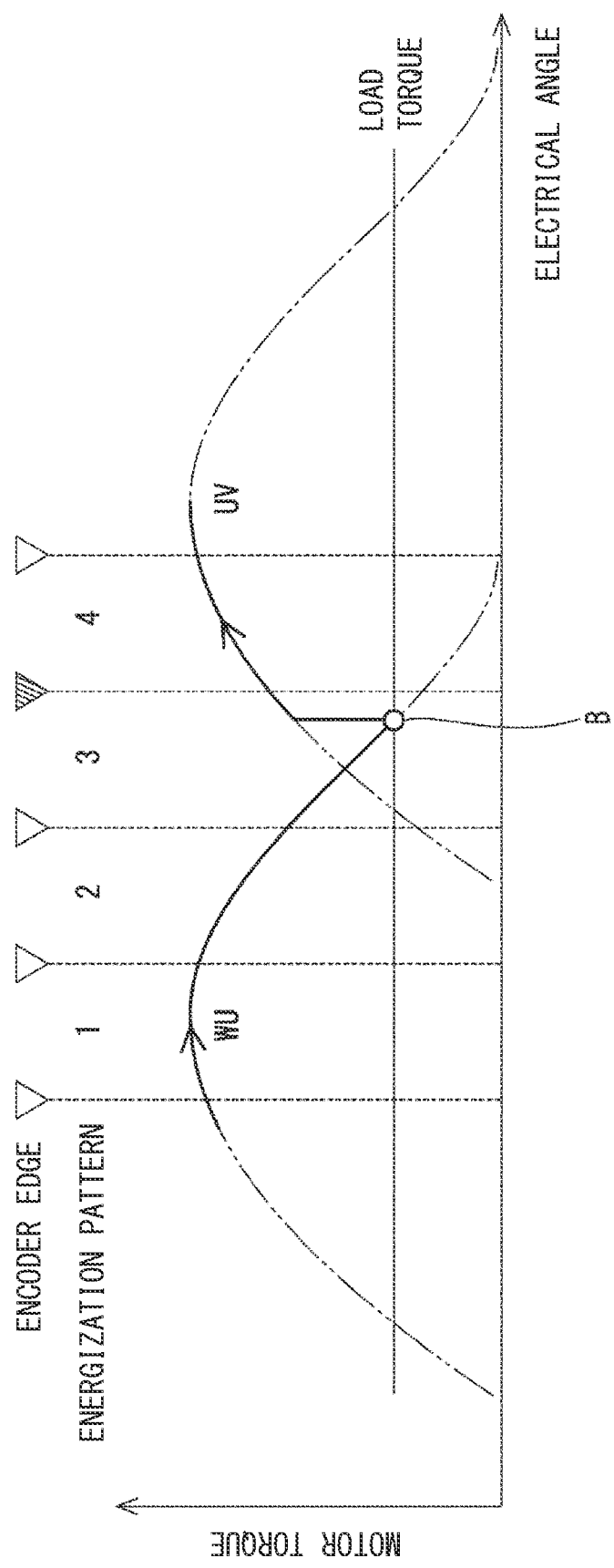
FIG. 21 is an explanatory diagram for explaining control during a motor standstill according to the fifth embodiment.

FIGS. 20A, 20B, and 21 show a fifth embodiment. The present embodiment is different from the above embodiments in the energization pattern. As shown in FIGS. 20A and 20B, in the present embodiment, WU-phase energization is performed in the energization patterns P0 to P3, UV-phase energization is performed in the energization patterns P4 to P7, and VW-phase energization is performed in the energization patterns P8 to P11. Further, during the forward rotation of the motor, when the encoder edge is detected in the energization pattern P3, the WU-phase energization is switched to the UV-phase energization. When the encoder edge is detected in the energization pattern P7, the UV-phase energization is switched to the VW-phase energization. When the encoder edge is detected in the energization pattern P11, the VW-phase energization is switched to the WU-phase energization.

Herein, in the present embodiment, there is a region where the motor torque drops in each of the energization patterns P0, P4, P8 immediately after the switching of the energization pattern. In the above embodiments, when the motor 10 is stopped, the motor 10 is resumed by setting back the energization phases. As shown in FIG. 21, in the present embodiment, in a case where the motor 10 stops at a balance point B, the energization phases remain unchanged even when the energization phases are set back by one. On the other hand, motor torque relatively larger than that in the regular pattern can be output by setting the energization phases forward by one.

Therefore, in the present embodiment, when the motor 10 comes to a standstill in the energization pattern in which the motor torque drops, the motor 10 is resumed by setting the energization phases forward by one. When the encoder edge is detected, the energization pattern is returned to the regular pattern. In this example, after the resumption, the energization pattern may be returned to the regular pattern upon the first detection of the encoder edge, and it is not necessary to take measures such as timing to return the energization pattern to the regular pattern.

In the present embodiment, the change pattern is an energization pattern on the advanced angle side of the standstill position of the motor 10. Specifically, when the energization pattern is set forward by one, and the present counter is n, energization is performed in an energization pattern corresponding to (n+1). As a result, it is possible to change the generated torque and appropriately resume the motor 10. Further, the same effect as those of the above embodiments is exerted.

Sixth and Seventh Embodiments

Figures 22A, 22B:
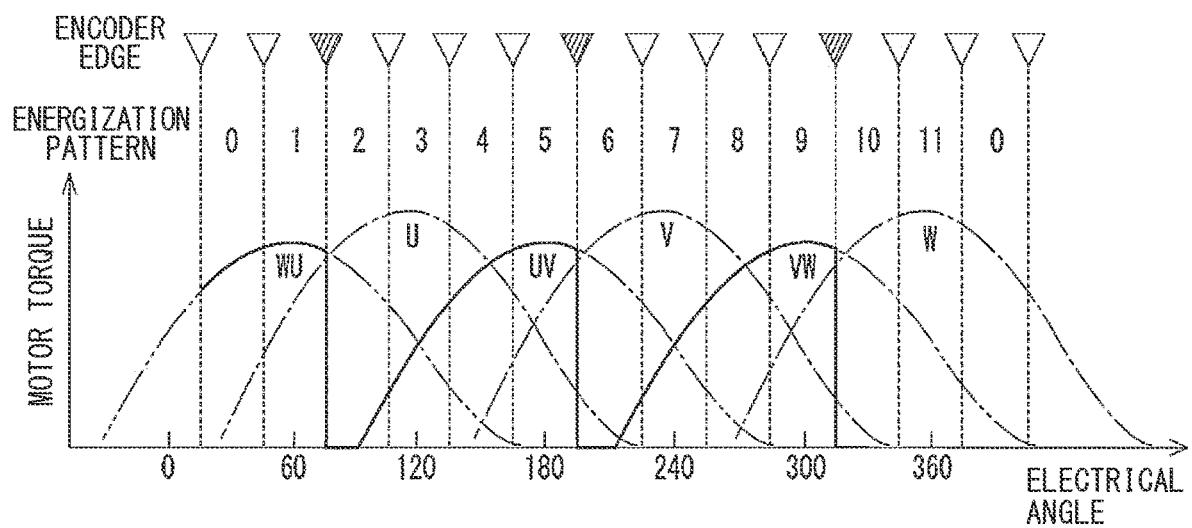
FIG. 22A is a diagram showing energization patterns and energization phases according to a sixth embodiment.
FIG. 22B is a diagram showing a relationship between an electrical angle and motor torque according to the sixth embodiment.

FIGS. 22A, 22B, 23, and 24 show a sixth embodiment and a seventh embodiment. As illustrated in FIGS. 22A and 22B, in the sixth embodiment, WU-phase energization is performed in the energization patterns P0 to P1 and P10 to P11, UV-phase energization is performed in the energization patterns P2 to P5, and VW-phase energization is performed in the energization patterns P6 to P9. Further, during the forward rotation of the motor, when the encoder edge is detected in the energization pattern P1, the WU-phase energization is switched to the UV-phase energization. When the encoder edge is detected in the energization pattern P5, the UV-phase energization is switched to the VW-phase energization. When the encoder edge is detected in the energization pattern P9, the VW-phase energization is switched to the WU-phase energization.

Figure 23:
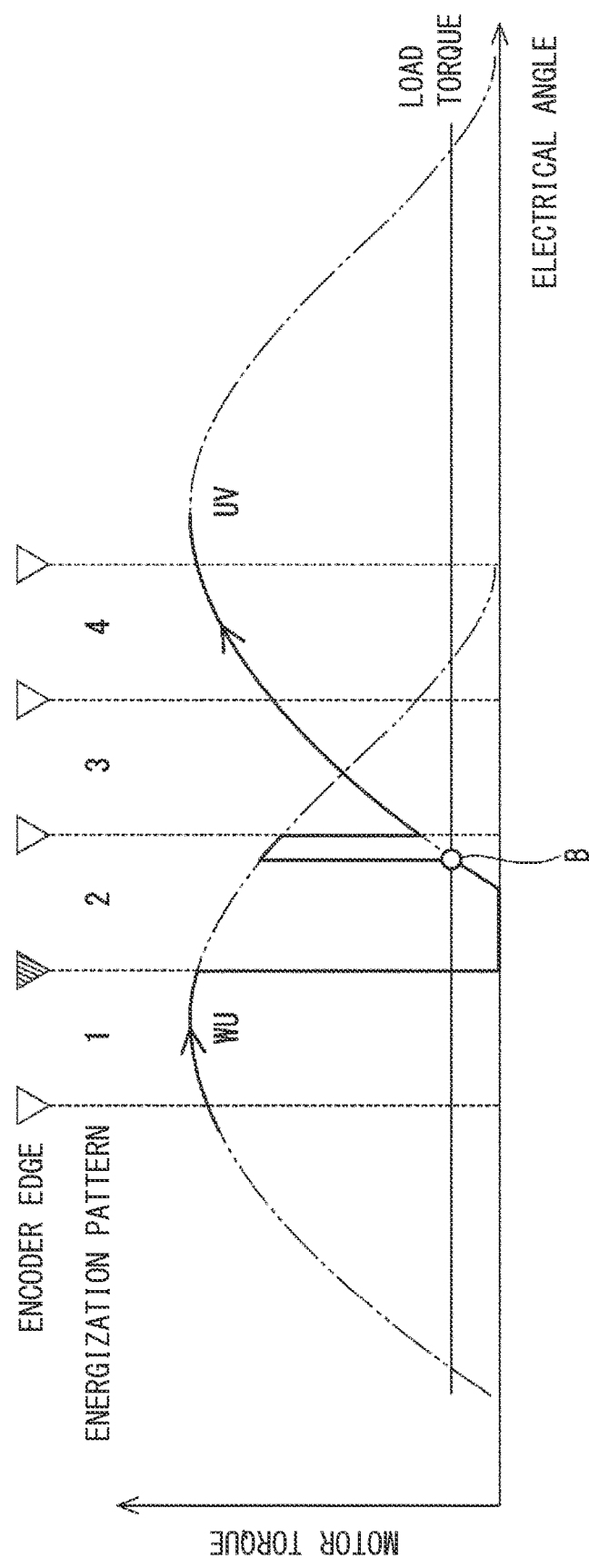
FIG. 23 is an explanatory diagram for explaining control during a motor standstill according to the sixth embodiment.

Herein, in each of the energization patterns P2, P6, P10 immediately after the switching of the energization pattern, there is a region where the motor torque drops. Therefore, as shown in FIG. 23, as in the second embodiment, when the motor 10 stops in the region where the motor torque drops, the motor 10 is resumed by setting the energization pattern back by one.

Figure 24:
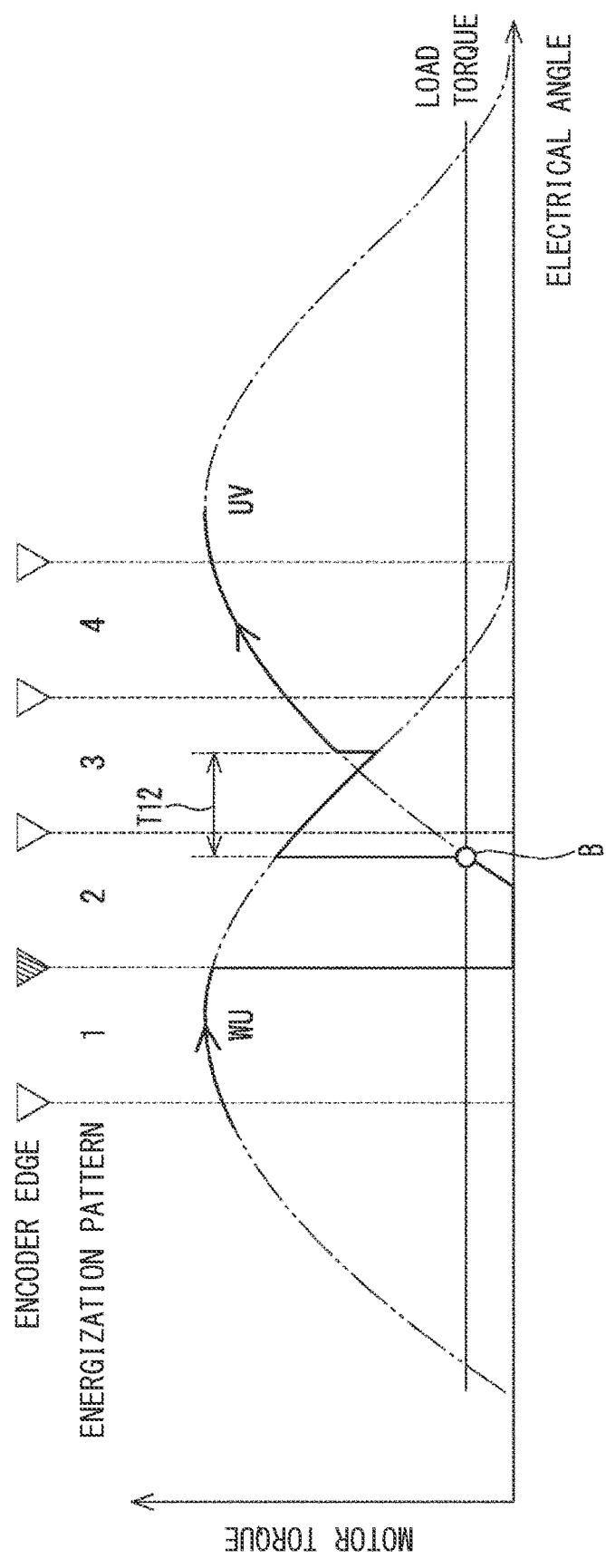
FIG. 24 is an explanatory diagram for explaining control during a motor standstill according to a seventh embodiment.

In the sixth embodiment, when the motor 10 advances to the standstill count value Cst+1, the energization pattern is returned to the regular pattern. In the seventh embodiment, the energization pattern is the same as that in the sixth embodiment, and as shown in FIG. 24, when the energization back duration T12 has elapsed since the setting back of the energization pattern by one, the energization pattern is returned to the regular pattern. With such a configuration as well, the same effect as those of the above embodiments is exerted.

Eighth and Ninth Embodiments

Figures 25A, 25B:
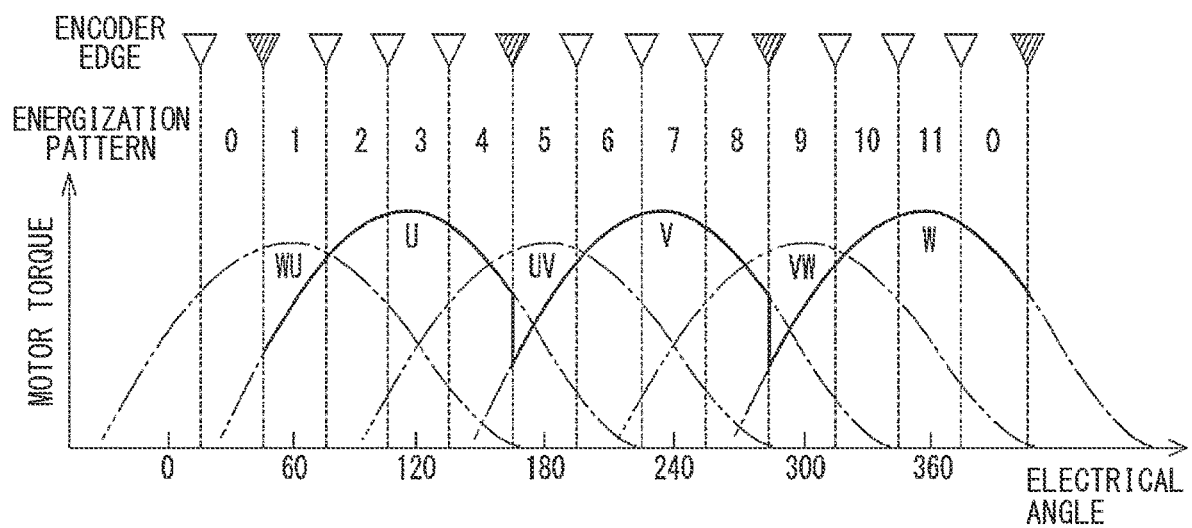
FIG. 25A is a diagram showing energization patterns and energization phases according to an eighth embodiment.
FIG. 25B is a diagram showing a relationship between an electrical angle and motor torque according to the eighth embodiment.

FIGS. 25A, 25B, 26, and 27 show an eighth embodiment and a ninth embodiment. As shown in FIGS. 25A and 25B, in the eighth embodiment, the motor 10 is rotated by repeating the one-phase energization without using the two-phase energization. In the eighth embodiment, U-phase energization is performed in the energization patterns P1 to P4, V-phase energization is performed in the energization patterns P5 to P8, and W-phase energization is performed in the energization patterns P9 to P11 and P0. Further, during the forward rotation of the motor, when the encoder edge is detected in the energization pattern P0, the W-phase energization is switched to the U-phase energization. When the encoder edge is detected in the energization pattern P4, the U-phase energization is switched to the V-phase energization. When the encoder edge is detected in the energization pattern P8, the V-phase energization is switched to the W-phase energization.

Figure 26:
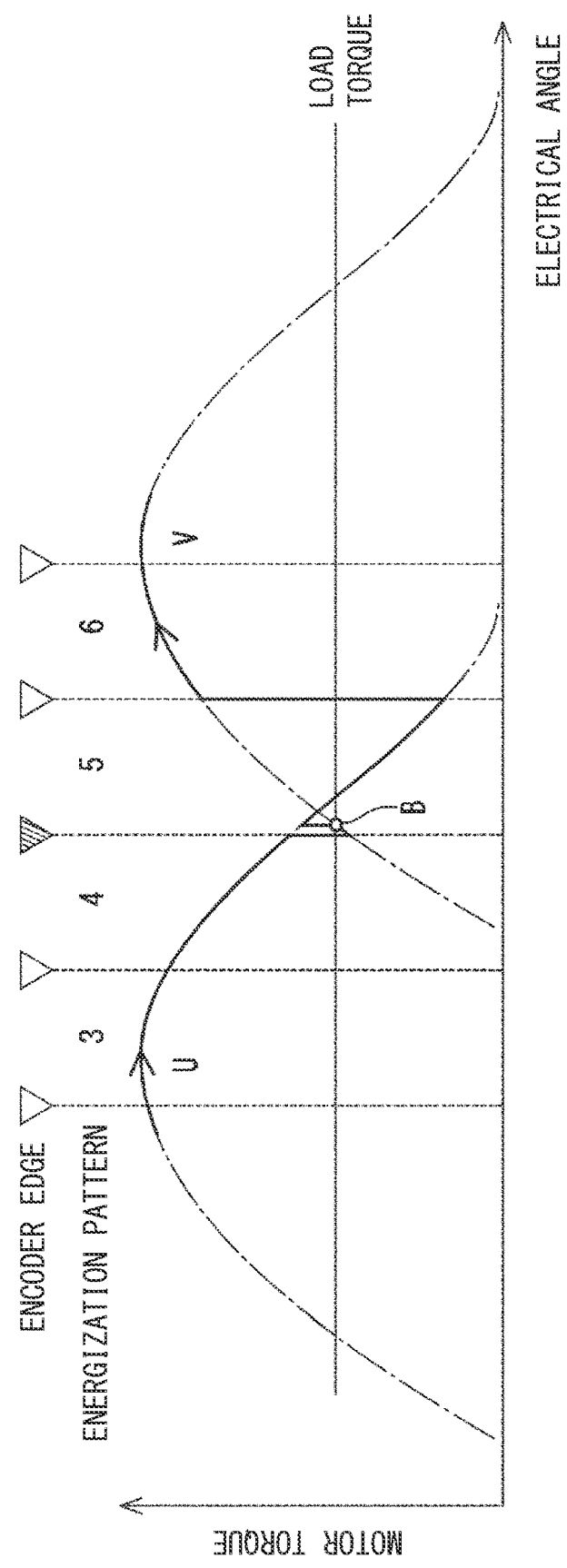
FIG. 26 is an explanatory diagram for explaining control during a motor standstill according to the eighth embodiment.

Herein, in each of the energization patterns P1, P5, P9 immediately after the switching of the energization pattern, there is a region where the motor torque drops. Therefore, as shown in FIG. 26, when the motor 10 stops in the region where the motor torque drops, the energization pattern is switched to an energization pattern in which torque can be generated in the region more than in the regular pattern. In the present embodiment, when the motor 10 is stopped, the energization pattern is set back by one.

In the eighth embodiment, when the motor 10 advances to the standstill count value Cst+1, the energization pattern is returned to the regular pattern. In the ninth embodiment, the energization pattern is the same as that in the eighth embodiment, and as shown in FIG. 27, when the energization back duration T12 has elapsed since the setting back of the energization pattern by one, the energization pattern is returned to the regular pattern. With such a configuration as well, the same effect as those of the above embodiments is exerted. Herein, the example in which the energization pattern is set back by one has been described. However, even in one-phase energization, when torque can be generated by setting the energization pattern forward by one as in the fifth embodiment, the energization pattern may be set forward by one. This also applies to two-phase and one-phase energization to be described later.

Tenth and Eleventh Embodiments

Figures 28A, 28B:
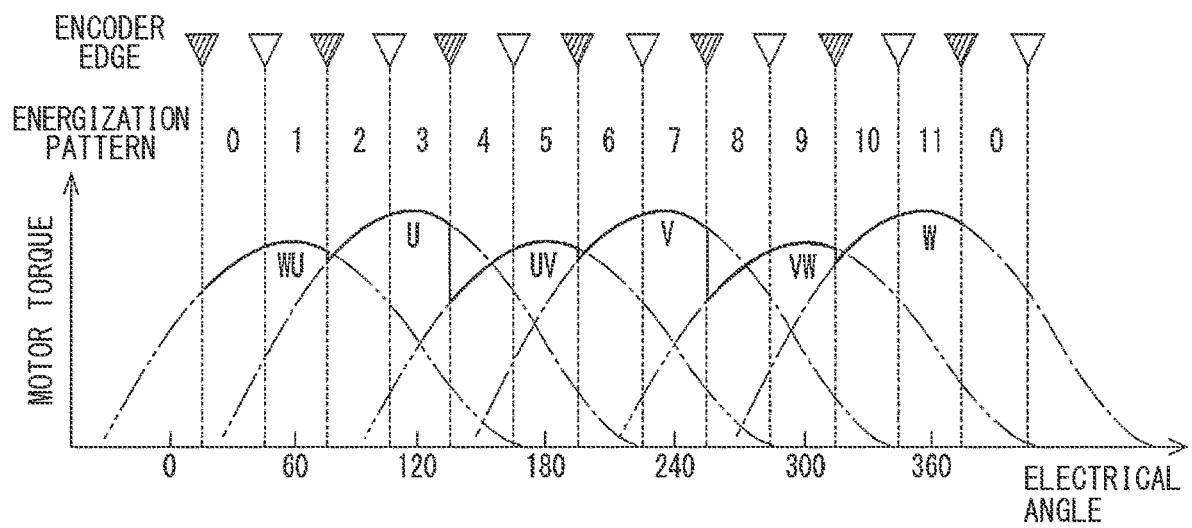
FIG. 28A is a diagram showing energization patterns and energization phases according to a tenth embodiment.
FIG. 28B is a diagram showing a relationship between an electrical angle and motor torque according to the tenth embodiment.

FIGS. 28A, 28B, 29, and 30 show a tenth embodiment and an eleventh embodiment. As shown in FIGS. 28A and 28B, in the tenth embodiment, the motor 10 is rotated by two-phase one-phase energization in which two-phase energization and one-phase energization are repeated alternately. In the tenth embodiment and the eleventh embodiment, WU-phase energization is performed in the energization patterns P0 to P1, U-phase energization is performed in the energization patterns P2 to P3, UV-phase energization is performed in the energization patterns P4 to P5, V-phase energization is performed in the energization patterns P6 to P7, VW-phase energization is performed in the energization patterns P8 to P9, and W-phase energization is performed in the energization pattern P10 to 11. The motor torque drops at a position where the energization pattern is switched.

Herein, when the current control is performed so that the current of the collective current Ia becomes constant, the motor torque fluctuates because each phase current differs between the time of one-phase energization and the time of two-phase energization. Specifically, as compared with a case where each phase current is constant, the torque at the time of the one-phase energization is larger than that at the time of the two-phase energization. In this case, the motor torque drops when the one-phase energization is switched to the two-phase energization.

Figure 29:
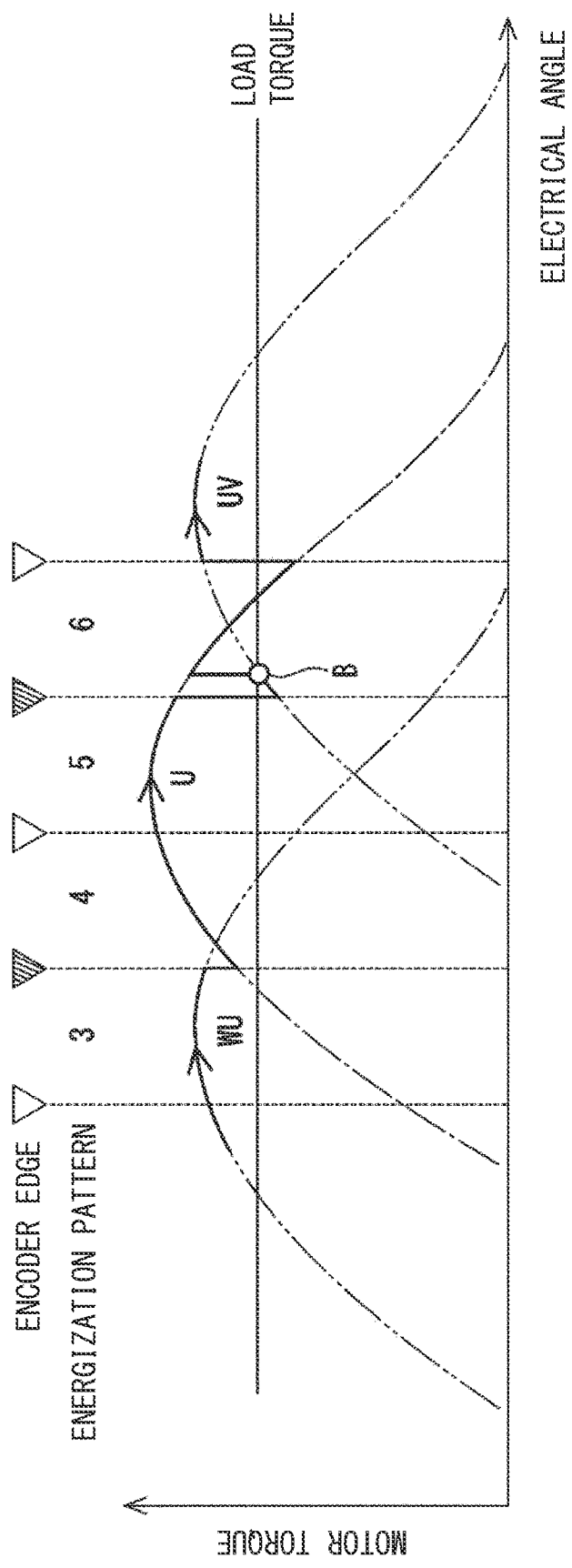
FIG. 29 is an explanatory diagram for explaining control during a motor standstill according to the tenth embodiment.

Therefore, as shown in FIG. 29, when the motor 10 stops in the region where the motor torque drops, the energization pattern is switched to an energization pattern in which torque can be generated in the region more than in the regular pattern. In the present embodiment, when the motor 10 is stopped, the energization pattern is set back by one.

Figure 30:
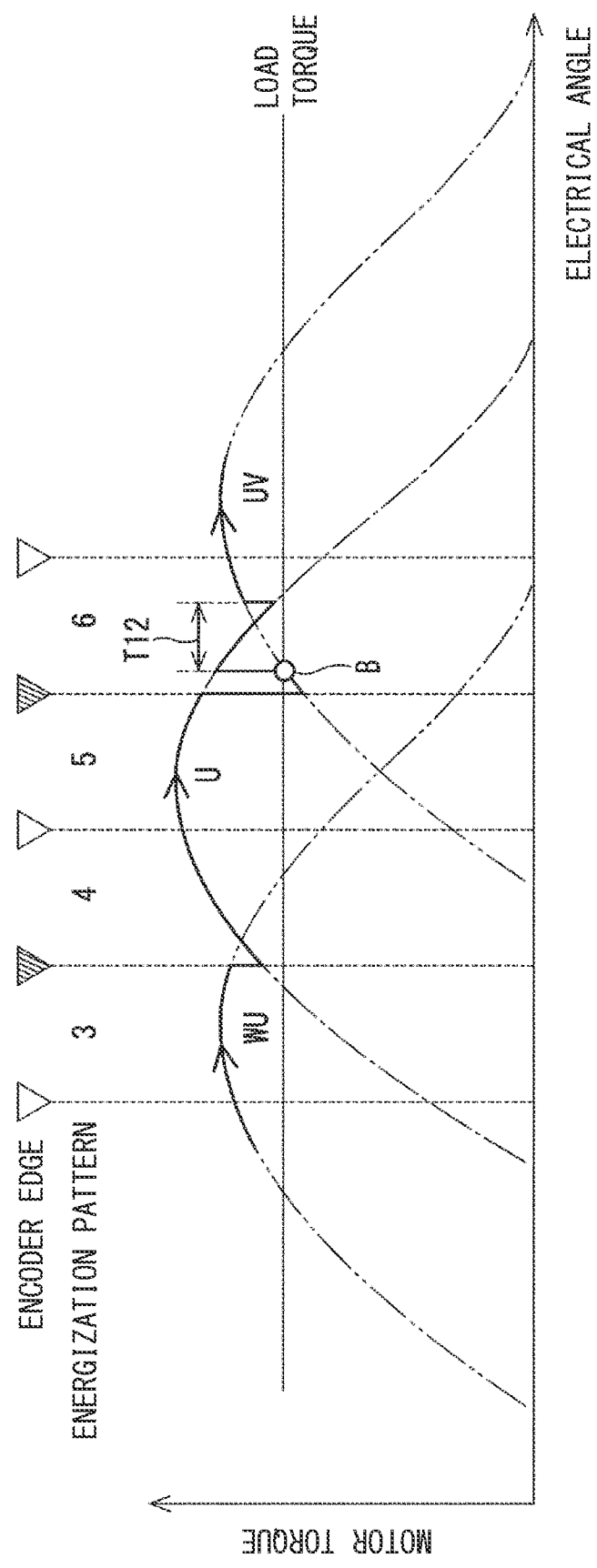
FIG. 30 is an explanatory diagram for explaining control during a motor standstill according to an eleventh embodiment.

In the tenth embodiment, when the motor 10 advances to the standstill count value Cs+1, the energization pattern is returned to the regular pattern. In the eleventh embodiment, the energization pattern is the same as that in the tenth embodiment, and as shown in FIG. 30, when the energization back duration T12 has elapsed since the setting back of the energization pattern by one, the energization pattern is returned to the regular pattern. With such a configuration as well, the same effect as those of the above embodiments is exerted.

In the above embodiments, the shift range control device 40 corresponds to the "motor control device", the encoder 13 corresponds to the "rotational position sensor", and the encoder count value Cen corresponds to the "detection value of the rotational position sensor". The energization back duration T12 corresponds to the "change pattern duration".

Other Embodiments

In the above embodiments, the motor is a switched reluctance motor. In another embodiment, as the motor, for example, a motor except for the switched reluctance motor, such as a DC brushless motor, may be used, and the number of magnetic poles and the like can be set arbitrarily. Further, the configuration of the drive circuit unit may be different depending on the motor to be used.

In the above embodiments, the rotational position sensor is an encoder. In another embodiment, a sensor except for the encoder, such as a resolver, may be used as the rotational position sensor. When the rotational position sensor is a linear sensor, for example, a position reached by rotation from the standstill position by a predetermined angle may be set as the energization resumption position or the return position. In the above embodiments, the potentiometer has been exemplified as the output shaft sensor. In another embodiment, the output shaft sensor may be except for the potentiometer, or the output shaft sensor may be omitted.

In the first embodiment, the energization pattern is changed in the torque decrease region, and the energization pattern is not changed in a region except for the torque decrease region. In another embodiment, S103 in FIG. 7 may be omitted, and the energization pattern may be changed in a region except for the torque decrease region when the motor 10 is in a standstill. In the second to tenth embodiments, when the motor 10 comes to a standstill, the energization pattern may be changed in the torque decrease region, and the energization pattern may not be changed in a region except for the torque decrease region.

In the above embodiments, the detent plate is provided with two recesses. In another embodiment, the number of recesses is not limited to two, and for example, recesses may be provided for each range. Further, the shift range switching mechanism, the parking lock mechanism, and the like may be different from those in the above embodiments.

In the above embodiments, the speed reducer is provided between the motor shaft and the output shaft. Although the detail of the speed reducer is not mentioned in the above embodiments, the speed reducer may have any configuration, such as one using a cycloid gear, a planetary gear, or a spur gear that transmits torque from a speed reduction mechanism substantially coaxial with the motor shaft to the drive shaft, and one using these gears in combination. In another embodiment, the speed reducer between the motor shaft and the output shaft may be omitted, or a mechanism except for the speed reducer may be provided. In the above embodiments, the motor control device is applied to a shift range switching system. In another embodiment, the motor control device may be applied to a device except for the shift range switching system.

The control unit and the technique according to the present disclosure may be achieved by a dedicated computer provided by constituting a processor and a memory programmed to execute one or more functions embodied by a computer program. Alternatively, the control unit and the technique according to the present disclosure may be achieved by a dedicated computer provided by constituting a processor with one or more dedicated hardware logic circuits. Alternatively, the control unit and the technique according to the present disclosure may be achieved using one or more dedicated computers constituted by a combination of the processor and the memory programmed to execute one or more functions and the processor with one or more hardware logic circuits. The computer program may store a computer-readable non-transitional tangible recording medium as an instruction to be executed by the computer. As mentioned above, the present disclosure is not limited to the above embodiments but can be implemented in various forms in the scope not deviating from its gist.

The present disclosure has been described in accordance with the embodiments. However, the present disclosure is not limited to the embodiments and structures. The present disclosure encompasses various modifications and modifications within an equivalent scope. In addition, various combinations and forms, as well as other combinations and forms including only one element, more than that, or less than that, are also within the scope and idea of the present disclosure.

What is claimed is:

1. A motor control device configured to control drive of a motor including a motor winding, the motor control device comprising:
    an energization control unit that is configured to control energization of the motor winding in accordance with an encoder count value of a rotational position sensor that is configured to detect a rotational position of the motor; and
    a standstill determination unit that is configured to determine a standstill of the motor, wherein
    the energization control unit is configured to, when the standstill of the motor is detected, control energization in a change pattern, which is an energization pattern different from a preset regular pattern, in accordance with the detection value of the rotational position sensor, and
    the standstill determination unit is configured to determine, when the encoder count value of the rotational position sensor remains unchanged over a standstill determination time,
    that the motor is in a torque decrease region in which a torque of the motor drops, and
    that the standstill of the motor occurs.

2. The motor control device according to claim 1, wherein the energization control unit is configured to, when the standstill of the motor is detected, perform de-energization and subsequently resume the energization in the change pattern.

3. The motor control device according to claim 2, wherein the energization control unit is configured to, when the rotational position returns to an energization resumption position after the de-energization, resume the energization in the change pattern.

4. The motor control device according to claim 2, wherein the energization control unit is configured to, when a de-energization duration elapses after the de-energization, resume the energization in the change pattern.

5. The motor control device according to claim 1, wherein the change pattern is an energization pattern on a retarded angle side of a standstill position of the motor.

6. The motor control device according to claim 1, wherein the change pattern is an energization pattern on an advanced angle side of a standstill position of the motor.

7. The motor control device according to claim 1, wherein the energization control unit is configured to, when the motor advances to a return position on an advanced angle side from a standstill position of the motor after the energization in the change pattern is started, return the change pattern to the regular pattern.

8. The motor control device according to claim 1, wherein the energization control unit is configured to, when a change pattern duration elapses after the energization is started in the change pattern, return the change pattern to the regular pattern.

9. The motor control device according to claim 1, wherein the change pattern is an energization pattern to generate a torque at a standstill position reversely to a rotational direction before the motor comes to the standstill, and the energization control unit is configured to return the energization pattern to the regular pattern after returning the motor to a lock position.

10. The motor control device according to claim 1, wherein
the energization control unit is configured to, when a standstill position of the motor is in a torque decrease region, make a change in the energization pattern, and
the energization control unit is configured to, when the standstill position of the motor is out of the torque decrease region, make no change in the energization pattern.

11. The motor control device according to claim 1, wherein the energization control unit is configured to, when the standstill of the motor is detected,
perform de-energization and
subsequently resume the energization in the change pattern when the rotational position returns to an energization resumption position by a load torque after the de-energization.

12. The motor control device according to claim 11, wherein
the rotational position sensor is a rotary encoder configured to output a pulse signal, and
the energization resumption position is a position where an encoder edge of the pulse signal is detected on a retarded angle side from a standstill position at which the standstill of the motor is detected.

13. The motor control device according to claim 12, wherein
the energization resumption position is a position where the encoder count value is set back by one on the retarded angle side from the standstill position.

14. A motor control device comprising:
a processor configured to
control energization of a motor winding of a motor to drive of the motor in accordance with an encoder count value (Cen) of a rotational position of the motor;
determine whether a standstill, in which a torque of the motor drops, occurs in the motor; and
determine, in response to the encoder count value (Cen) of the rotational position sensor that remains unchanged over a standstill determination time,
that the motor is in a torque decrease region in which a torque of the motor drops, and
that the standstill of the motor occurs, and
in response to detection of the standstill, control energization in a change pattern, which is different from a preset regular pattern, in accordance with the detection value of the rotational position.

15. The motor control device according to claim 14, wherein
the processor is configured to, when the standstill of the motor is detected,
perform de-energization and
subsequently resume the energization in the change pattern when the rotational position returns to an energization resumption position by a load torque after the de-energization.

16. The motor control device according to claim 15, wherein
the rotational position sensor is a rotary encoder configured to output a pulse signal, and
the energization resumption position is a position where an encoder edge of the pulse signal is detected on a retarded angle side from a standstill position at which the standstill of the motor is detected.

17. The motor control device according to claim 16, wherein
the energization resumption position is a position where the encoder count value is set back by one on the retarded angle side from the standstill position.

* * * * *